(12) United States Patent
Sengupta et al.

(10) Patent No.: US 12,732,507 B2
(45) Date of Patent: Sep. 8, 2026

(54) CROSS-TENANT ACCESS FOCUS

(71) Applicant: Microsoft Technology Licensing, LLC, Redmond, WA (US)

(72) Inventors: Sucharit Sengupta, Bothell, WA (US); Ramachandra Ravitej Vennapusa, Bothell, WA (US); Hardy Wijaya, Woodinville, WA (US); Prakash Narayanan, Round Rock, TX (US); Shane Anil Pereira, Bellevue, WA (US); Srikanth Shoroff, Bellevue, WA (US); Shashidhar Lanka Venkata, Sammamish, WA (US); Udaya Kumar Bhaskara, Redmond, WA (US); Abhiram Srinivasan, Coquitlam (CA); Ashutosh Parija, Seattle, WA (US); Ananda Narayanan Pulamanthole Pisharathu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 58 days.

(21) Appl. No.: 18/518,777

(22) Filed: Nov. 24, 2023

(65) Prior Publication Data

US 2025/0150458 A1 May 8, 2025

Related U.S. Application Data

(60) Provisional application No. 63/547,026, filed on Nov. 2, 2023.

(51) Int. Cl.
*H04L 9/40* (2022.01)

(52) U.S. Cl.
CPC .......... *H04L 63/105* (2013.01); *H04L 63/104* (2013.01)

(58) Field of Classification Search
CPC ............................ H04L 63/105; H04L 63/104
See application file for complete search history.

(56) References Cited

U.S. PATENT DOCUMENTS 7,543,140 B2 6/2009 Dillaway et al.
7,900,248 B2 3/2011 Ellison et al.
(Continued)

OTHER PUBLICATIONS

Yang, Shin-Jer, Pei-Ci Lai, and Jyhjong Lin. “Design role-based multi-tenancy access control scheme for cloud services.” 2013 International Symposium on Biometrics and Security Technologies. IEEE, 2013. (Year: 2013).*
(Continued)

*Primary Examiner* — Theodore C Parsons
*Assistant Examiner* — Sameera Wickramasuriya
(74) *Attorney, Agent, or Firm* — Rainier Patents, P.S.

(57) ABSTRACT

In a cloud computing environment, a cross-tenant access security measure monitors conditional access policies for changes or additions that hamper or threaten an authorized access from an assistant tenant user to a focus tenant. Some cross-tenant access security tracks role assignments to detect rogue roles, or detect hampering role changes. In some cases, focus tenant events and assistant tenant events are correlated in an audit. In some cases, the authorized access is a zero standing time bound access. In some cases, the authorized access is constrained to an IP address range, or constrained to login from a managed device, or both. In some cases, assets are excluded from managed response remediation actions. In some, managed response is modulated by product-specific Role Based Access Control. In some, repeated logins are avoided, to permit faster managed responses.

20 Claims, 8 Drawing Sheets

METHOD 1300

START

RECEIVE / INTERCEPT 722 / 1302 ATTEMPTED ACCESS 432

DETERMINE 1306 ASSET EXCLUSION STATUS 1308

RESTRICT 1310 ACCESS TO EXCLUDED ASSET

FINISH

(56) References Cited

U.S. PATENT DOCUMENTS

| | | | | |
|---|---|---|---|---|
| 11,516,222 | B1 * | 11/2022 | Srinivasan | G06F 21/577 |
| 11,777,992 | B1 * | 10/2023 | Cross | H04L 63/0876 726/5 |
| 11,799,951 | B1 | 10/2023 | Maloo et al. | |
| 2009/0285120 | A1 * | 11/2009 | Swan | H04L 41/12 370/254 |
| 2014/0330936 | A1 * | 11/2014 | Factor | H04L 63/0281 709/219 |
| 2016/0277411 | A1 * | 9/2016 | Dani | G06F 21/6218 |
| 2017/0331813 | A1 * | 11/2017 | Lander | H04L 63/0815 |
| 2017/0331832 | A1 * | 11/2017 | Lander | H04L 63/102 |
| 2018/0083967 | A1 * | 3/2018 | Subramanian | H04L 63/10 |
| 2021/0392142 | A1 * | 12/2021 | Stephens | H04L 63/104 |
| 2022/0345458 | A1 * | 10/2022 | Kumarji | H04L 63/105 |
| 2023/0153449 | A1 | 5/2023 | Li et al. | |

OTHER PUBLICATIONS

"Application as Filed in U.S. Appl. No. 17/820,617", filed Aug. 18, 2022, 46 Pages.

"Application as Filed in U.S. Appl. No. 17/835,050", filed Jun. 8, 2022, 70 Pages.

"Application as Filed in U.S. Appl. No. 18/328,089", filed Date: Jun. 2, 2023, 63 Pages.

Vasil Michev, "Cross-tenant access policy (XTAP) and the Graph API", retrieved from << https://www.michev.info/blog/ post/3681/ cross-tenant-access-policy-xtap-and-the-graph-api >>, Posted onFebruary 10, 2022, 12 pages.

"View applied Conditional Access policies in Azure AD sign-in logs", retrieved from << https://learn.microsoft.com/en-us/azure/ active-directory/reports-monitoring/how-to-view-applied-conditional-access-policies >>, Feb. 2, 2023, 3 pages.

Abhishek Kumar, "Enforcing Zero Standing Access", retrieved from << https://query.prod.cms.rt.microsoft.com/cms/api/am/binary/ RE2ClzC >>, Sep. 24, 2018, 8 pages.

"Microsoft Defender Experts for Hunting", retrieved from << https://learn.microsoft.com/en-us/microsoft-365/security/defender/ defender-experts-for-hunting?view=o365-worldwide >>, Mar. 6, 2023, 2 pages.

"Microsoft Security Experts", retrieved from << https://www. microsoft.com/en-us/security/business/services/ >>, No. later than May 2, 2023, 5 pages.

Vasu Jakkal, "Building a safer world together with our partners—introducing Microsoft Security Experts", retrieved from << https:// www.microsoft.com/en-us/security/blog/2022/05/09/building-a-safer-world-together-with-our-partners-introducing-microsoft-security-experts/ >>, May 9, 2022, 16 pages.

"Microsoft Defender Experts for Hunting proactively hunts threats", retrieved from << https://www.microsoft.com/en-us/security/blog/ 2022/08/03/microsoft-defender-experts-for-hunting-proactively-hunts-threats/ >>, Aug. 3, 2022, 10 pages.

"Create device security policies in Basic Mobility and Security", retrieved from << https://learn.microsoft.com/en-us/microsoft-365/ admin/basic-mobility-security/create-device-security-policies?view= o365-worldwide >>, Feb. 16, 2023, 8 pages.

"Audit logging and monitoring overview", retrieved from << https:// learn.microsoft.com/en-us/compliance/assurance/ assurance-audit-logging >>, Apr. 3, 2023, 7 pages.

"Overview: Cross-tenant access with Azure AD External Identities", retrieved from << https://learn.microsoft.com/en-us/azure/ active-directory/external-identities/cross-tenant-access-overview >>, Mar. 15, 2023, 12 pages.

"Introduction to granular delegated admin privileges (GDAP)", retrieved from << https://learn.microsoft.com/en-us/ partner-center/ gdap-introduction >>, Mar. 21, 2023, 2 pages.

"Use the What If tool to troubleshoot Conditional Access policies", retrieved from << https://learn.microsoft.com/en-us/azure/active-directory/conditional-access/what-if-tool >>, Mar. 15, 2023, 4 pages.

"Microsoft Intune securely manages identities, manages apps, and manages devices", retrieved from << https://learn.microsoft.com/ en-us/mem/intune/fundamentals/what-is-intune >>, Apr. 2, 2023, 11 pages.

"Device groups in Microsoft Defender for Business", retrieved from << https://learn.microsoft.com/en-us/microsoft-365/ security/defender-business/mdb-create-edit-device-groups?view=o365-worldwide >>, May 17, 2023, 4 pages.

"Manage Microsoft Entra groups and group membership", retrieved from << https://learn.microsoft.com/en-us/entra/fundamentals/how-to-manage-groups >>, Oct. 23, 2023, 11 pages.

"GDAP frequently asked questions", retrieved from << https://learn. microsoft.com/en-us/partner-center/gdap-faq >>, Nov. 9, 2023, 24 pages.

"Introduction to granular delegated admin privileges (GDAP)", retrieved from << https://learn.microsoft.com/en-us/partner-center/ gdap-introduction >>, Jul. 31, 2023, 2 pages.

"GDAP bulk migration tool", retrieved from << https://learn. microsoft.com/en-us/partner-center/gdap-bulk-migration-tool >>, May 24, 2023, 18 pages.

"Overview: Cross-tenant access with Microsoft Entra External ID", retrieved from << https://learn.microsoft.com/en-us/entra/external-id/cross-tenant-access-overview >>, Nov. 7, 2023, 18 pages.

"Microsoft Defender Experts for Hunting", retrieved from << https://learn.microsoft.com/en-us/microsoft-365/security/ defender/ defender-experts-for-hunting?view=o365-worldwide >>, Oct. 18, 2023, 2 pages.

"Microsoft Security Experts", retrieved from << https://www. microsoft.com/en-us/security/business/services/ >>, No. later than Nov. 10, 2023, 5 pages.

Vasu Jakkal, "Building a safer world together with our partners—introducing Microsoft Security Experts", retrieved from << https:// www.microsoft.com/en-us/security/blog/2022/05/09/building-a-safer-world-together-with-our-partners-introducing-microsoft-security-experts/ >>, Aug. 11, 2022, 7 pages.

"Microsoft Defender Experts for Hunting proactively hunts threats", retrieved from << https://www.microsoft.com/en-us/security/blog/ 2022/08/03/microsoft-defender-experts-for-hunting-proactively-hunts-threats/ >>, Aug. 3, 2022, 4 pages.

Alam, et al., "A Cross Tenant Access Control (CTAC) Model for Cloud Computing: Formal Specification and Verification", IEEE, vol. No. 12, Issue No. 6, Dec. 29, 2016, pp. 1259-1268.

International Search Report and Written Opinion received for PCT Application No. PCT/US2024/052170, Jan. 29, 2025, 14 Pages.

Madani, et al., "Access Control for Collaboration in Cloud Environment: A Comparative Analysis", IEEE, Oct. 26, 2023, pp. 1-7.

International Preliminary Report on Patentability (Chapter I) Received for PCT Application No. PCT/US2024/052170, mailed on May 15, 2026, 8 pages.

* cited by examiner

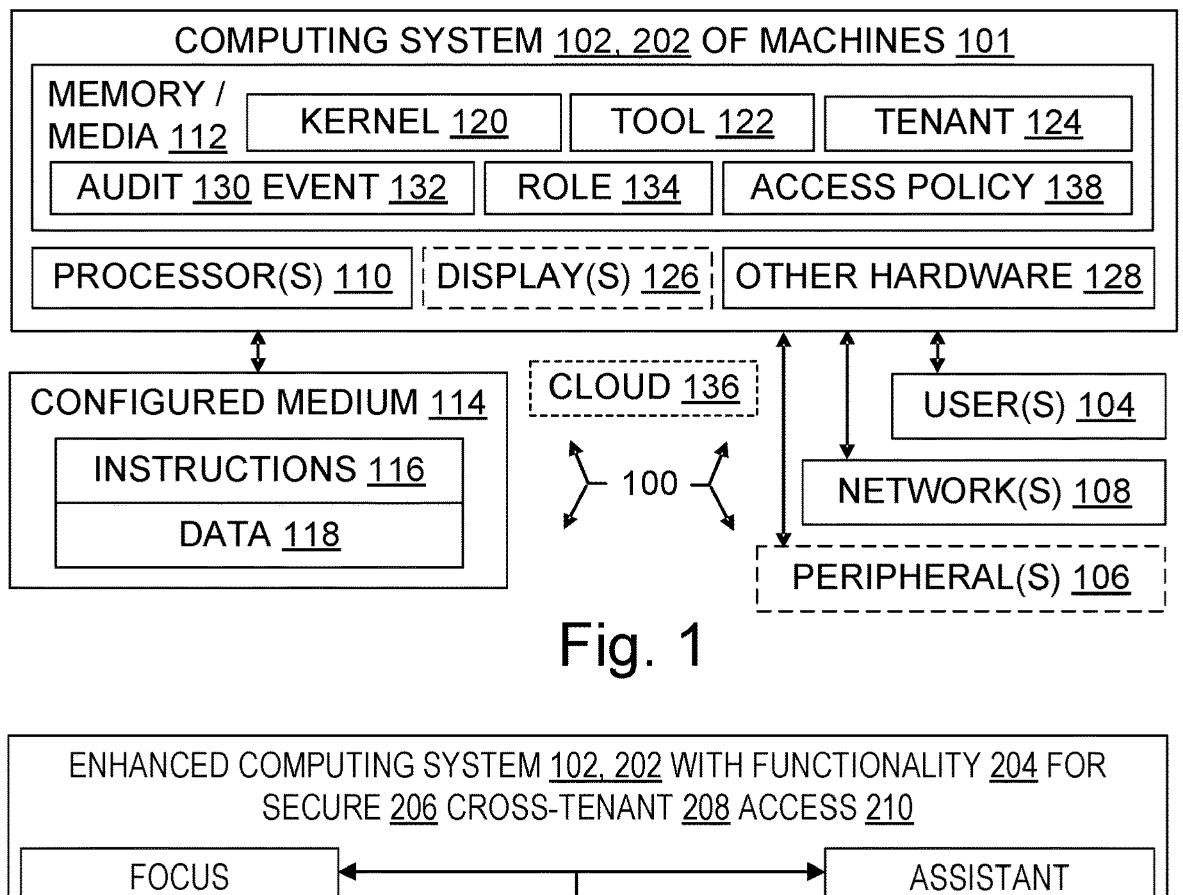
Fig. 1
Fig. 2
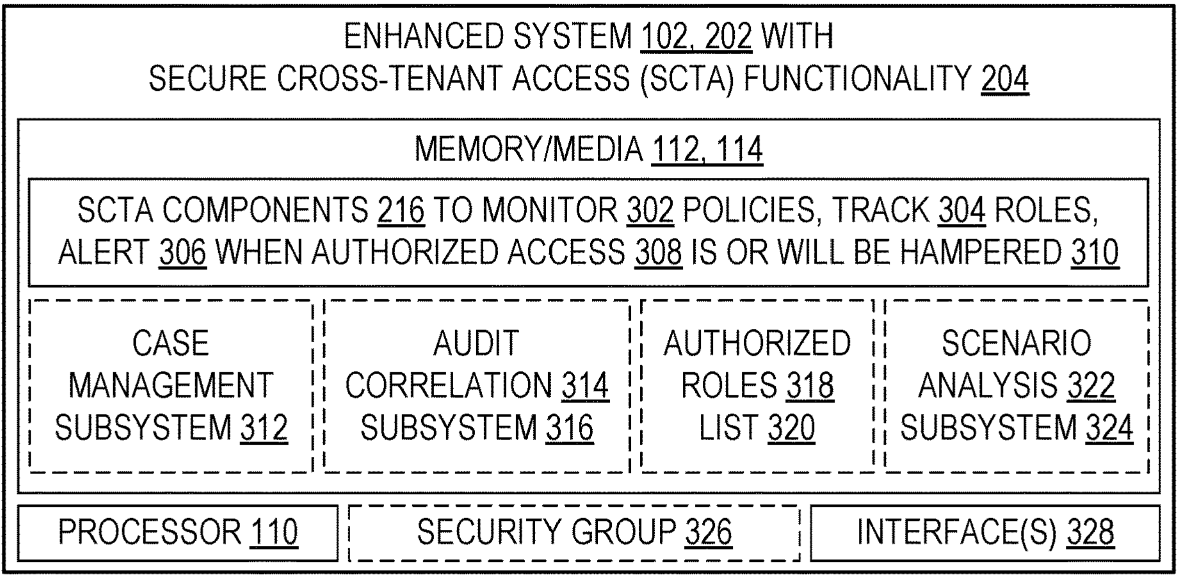
Fig. 3

CROSS-TENANT ACCESS FOCUS

BACKGROUND

Attacks on a computing system may take many different forms, including some forms which are difficult to predict, and forms which may vary from one situation to another. Accordingly, one of the guiding principles of cybersecurity is "defense in depth". In practice, defense in depth is often pursed by forcing attackers to encounter multiple different kinds of security mechanisms at multiple different locations around or within the computing system. No single security mechanism is able to detect every kind of cyberattack, able to determine the scope of an attack or vulnerability, or able to end every detected cyberattack. But sometimes combining and layering a sufficient number and variety of defenses and investigative tools will prevent an attack, deter an attacker, or at least help limit the scope of harm from an attack or a vulnerability.

To implement defense in depth, cybersecurity professionals consider the different kinds of attacks that could be made against a computing system, and the different vulnerabilities the system may include. They select defenses based on criteria such as: which attacks are most likely to occur, which attacks are most likely to succeed, which attacks are most harmful if successful, which defenses are in place, which defenses could be put in place, and the costs and procedural changes and training involved in putting a particular defense in place or removing a particular vulnerability to attack. They investigate the scope of an attack, and try to detect vulnerabilities before they are exploited in an attack. Some defenses or investigations might not be feasible or cost-effective for the particular computing system. However, improvements in cybersecurity remain possible, and worth pursuing.

SUMMARY

Some embodiments address technical challenges raised by the prospect of authorizing a user in one cloud computing tenant to command a performance of operations in another cloud computing tenant. A secure cross-tenant access raises challenges such as how to technologically constrain the access to an authorized scope and how to technologically prevent or mitigate attempts to hamper the authorized access, for example. Sometimes the operations performed relate to cybersecurity, such as operations to reduce an attack surface, remove a security vulnerability, or investigate a security incident, among others. However, teachings herein are not limited to cross-tenant cybersecurity operations.

In some embodiments, security mechanisms integrated with granular delegated admin privileges (GDAP) focus on a particular tenant, focus on one or more particular asset exclusions, focus on one or more particular product-specific roles, or focus on a combination of the foregoing.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. Subject matter scope is defined with claims as properly understood, and to the extent this Summary conflicts with the claims, the claims should prevail.

BRIEF DESCRIPTION OF THE DRAWINGS

A more particular description will be given with reference to the attached drawings. These drawings only illustrate selected aspects and thus do not fully determine coverage or scope.

FIG. 1 is a diagram illustrating aspects of computer systems and also illustrating configured storage media, including some aspects generally suitable for systems which provide secure cross-tenant access (SCTA) functionality;

FIG. 2 is a block diagram illustrating an enhanced system configured with an SCTA functionality;

FIG. 3 is a block diagram illustrating aspects of a system enhanced with an SCTA functionality;

DETAILED DESCRIPTION

Overview

Figure 4:
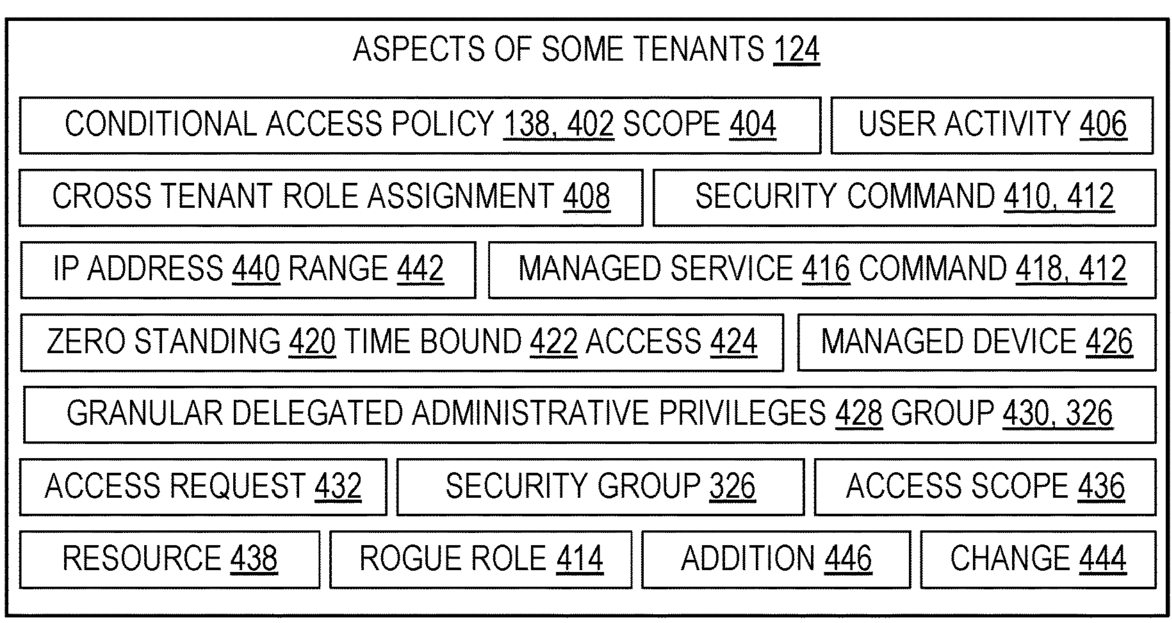
FIG. 4 is a block diagram illustrating some additional aspects of tenants.

Some teachings described herein were motivated by technical challenges faced during efforts to improve technology for allowing cybersecurity experts to perform security operations in computing systems. In particular, challenges were faced during efforts to safely improve access by managed services personas like technicians, security operators, and information technology operators to let them login into a customer tenant to solve and remediate issues in the customer tenant while keeping the customer's environment safe and secure.

A multi-tenant cloud architecture allows multiple tenants to share computing resources in a public, hybrid, or private cloud. Tenants are cloud computing constructs at a level between users and the cloud overall. A given tenant typically has more than one user account. Cross-tenant access raises security concerns in many cloud computing environments, so a user in one tenant does not automatically or easily receive access to the user data, settings, hardware, applications, logs, and other resources in a different tenant. One security concern is that the access could be expanded beyond the authorized scope, and another security concern is that the access could shut down or hindered despite being authorized. These and other concerns were motivations for some of the present disclosure, but teachings herein are not limited in their scope or applicability to particular motivational challenges.

Some embodiments described herein utilize or provide a cybersecurity method for secure cross-tenant access, including monitoring a non-hampering conditional access policy of a focus tenant, the monitoring including checking for a hampering change in the non-hampering conditional access policy, the monitoring also including checking for an addition of a hampering conditional access policy, wherein the hampering change is a change which hampers an authorized access to the focus tenant by a user from an assistant tenant, and the hampering conditional access policy is a conditional access policy which hampers the authorized access to the focus tenant by the user from the assistant tenant.

In these embodiments, this policy monitoring functionality has the technical benefit of mitigating accidental or surreptitious policy changes that would shut down or hinder authorized cross-tenant access. In some scenarios, the assistant tenant user activity is controlled by a security expert who works for a cloud service provider, the focus tenant is a customer tenant of the cloud service provider, and the cross-tenant access is authorized by a customer admin in order to improve the customer tenant's security or investigate a security incident in the customer tenant, or do both. The policy monitoring functionality makes it more difficult for an attacker to use access policy changes to stop the customer tenant from receiving expert security assistance.

Some embodiments described herein utilize or provide a cybersecurity method for secure cross-tenant access, including tracking a cross tenant role assignment of the focus tenant, the tracking including inspecting the cross tenant role assignment for a change in the cross tenant role assignment. This role monitoring functionality has the technical benefit of mitigating accidental or surreptitious role changes that would shut down or hinder authorized cross-tenant access. Moreover, in some embodiments the tracking includes detecting a rogue role. The authorized cross tenant access is not necessarily hampered by the rogue role, but an attacker has leveraged that authorized access to surreptitiously add an additional role that was not agreed to by the customer. If this rogue role is not detected, it can be used later by the attacker to maliciously access the customer tenant.

Some embodiments described herein utilize or provide a cybersecurity method for secure cross-tenant access, including correlating a focus tenant audit with an assistant tenant audit, thereby producing a correlated audit of activity of the user in the focus tenant and activity of the user in the assistant tenant. This audit correlation functionality has the technical benefit of permitting detection of deviations by the assistant tenant user from the set of operations authorized by the customer, and also has the technical benefit of showing that the assistant tenant user did or did not perform particular operations.

For example, in some scenarios a customer tenant admin approves an access by a security investigator with the caveat that the access is limited to investigating an incident and no changes will be made in the customer tenant security controls by the investigator during the access. Correlating audits ties together the security investigator's request for access, the admin's response granting access with the no-changes caveat, the security investigator's login to the customer tenant and activities during the access, the security investigator's logout from the customer tenant, and the subsequent teardown of the access grant. Correlated audits are thus useful to answer questions such as whether the security investigator changed any security controls, how the admin described the purpose of the access grant, and whether the security investigator was logged in at the time a security control was changed if the security control change is not shown in the logs.

Some embodiments described herein utilize or provide a cybersecurity method for secure cross-tenant access, including receiving in the focus tenant a command from the user, wherein the command is in at least one of the following command categories: security investigation commands, security modification commands, or managed service commands. This command functionality has the technical benefit of expanding secure cross tenant to include any managed service commands, in addition to security commands or instead of security commands. For example, secure access may be granted to a government regulator, to a court-appointed expert, to SaaS vendor, or to a vetted consultant in order to install or performance tune a particular service.

Some embodiments described herein utilize or provide a cybersecurity method for secure cross-tenant access, including receiving constraining the authorized access to the focus tenant by the user from the assistant tenant to be access only via login from an authorized managed device. In addition, or instead, some embodiments constrain the authorized access to the focus tenant by the user from the assistant tenant to be access only via login from a specific IP address range. This access constraint functionality has the technical benefit of making the authorized cross tenant access even more secure. In some embodiments, it is an optional supplement to, not a replacement for, the monitoring, tracking, detecting, alerting, and other functionalities described herein.

Some embodiments described herein utilize or provide a cybersecurity method for focused secure cross-tenant access, including: receiving or intercepting an attempted access to an asset during a remediation action; determining based on at least an exclusion group whether the asset is or includes an excluded asset; and in response to determining that the asset is or includes an excluded asset, barring cross-tenant access to the excluded asset or imposing an additional access requirement on cross-tenant access to the excluded asset. This access constraint functionality has the technical benefit of preventing inadvertent interference with business-critical assets during cross-tenant incident mitigation or other managed response activity. An inadvertent action, such as isolating a business-critical server or resetting the credentials of an executive's account, can have an adverse business impact.

Some embodiments described herein utilize or provide a cybersecurity method for focused secure cross-tenant access, including: creating or modifying a product-specific cross-tenant role, and enforcing cross-tenant access to an asset based on at least the product-specific cross-tenant role. This access constraint functionality has the technical benefit of providing granularity which limits the scope of cross-tenant asset access on a per-role per-product basis instead on merely a per-role basis, thereby providing improved focus that reduces the risk of an inadvertent impact of an access to a different product than the intended product.

Some embodiments described herein utilize or provide a cybersecurity method for focused secure cross-tenant access, including: providing or utilizing a cross-tenant built-in (no additional login required) access to an asset. This access constraint functionality has the technical benefit of reducing response time during a managed response to a security incident, thereby improving damage reduction and risk reduction.

These and other benefits are not limited to method embodiments, and they will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 136. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface 328 by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface supports interaction between an embodiment and one or more human users. In some embodiments, the user interface includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 136 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include security tools or software applications, on mobile devices 102 or workstations 102 or servers 102, editors, compilers, debuggers and other software development tools, as well as APIs, browsers, or webpages and the corresponding software for protocols such as HTTPS, for example. Files, APIs, endpoints, and other resources may be accessed by an account or set of accounts, user 104 or group of users 104, IP address or group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory nor a computer-readable storage device is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: chiplets, hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUS, and/or quantum processors), memory/storage media 112, peripherals 106, and displays 126, some operating environments also include other hardware 128, such as batteries, buses, power supplies, wired and wireless network interface cards, for instance. The nouns “screen” and “display” are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully “air gapped” by reason of being disconnected or only intermittently connected to another networked device or remote cloud. In particular, secure cross-tenant access functionality 204 could be installed on an air gapped network and then be updated periodically or on occasion using removable media 114, or not updated at all. Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under “Operating Environments” form part of some embodiments. This document’s headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current disclosure.

In any later application that claims priority to the current application, reference numerals may be added to designate items disclosed in the current application. Such items may include, e.g., software, hardware, steps, processes, systems, functionalities, mechanisms, data structures, computational resources, programming languages, tools, workflows, or algorithm implementations, or other items in a computing environment, which are disclosed herein but not associated with a particular reference numeral herein. Corresponding drawings may also be added.

More about Systems

FIG. 2 illustrates a computing system 102 configured by one or more of the secure cross-tenant access enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

FIG. 3 shows some aspects of some enhanced systems 202. This is not a comprehensive summary of all aspects of enhanced systems 202 or all aspects of secure cross-tenant access functionality 204. Nor is this Figure a comprehensive summary of all aspects of an environment 100 or system 202 or other context of an enhanced system 202, or a comprehensive summary of any aspect of functionality 204 for potential use in or with a system 102. FIG. 3 items are discussed at various points herein, and additional details regarding them are provided in the discussion of a List of Reference Numerals later in this disclosure document.

FIG. 4 shows some additional aspects of cloud tenants 124. This is not a comprehensive summary of all additional aspects of tenants 124 or clouds 136. FIG. 4 items are discussed at various points herein, and additional details regarding them are provided in the discussion of a List of Reference Numerals later in this disclosure document.

Figure 5:
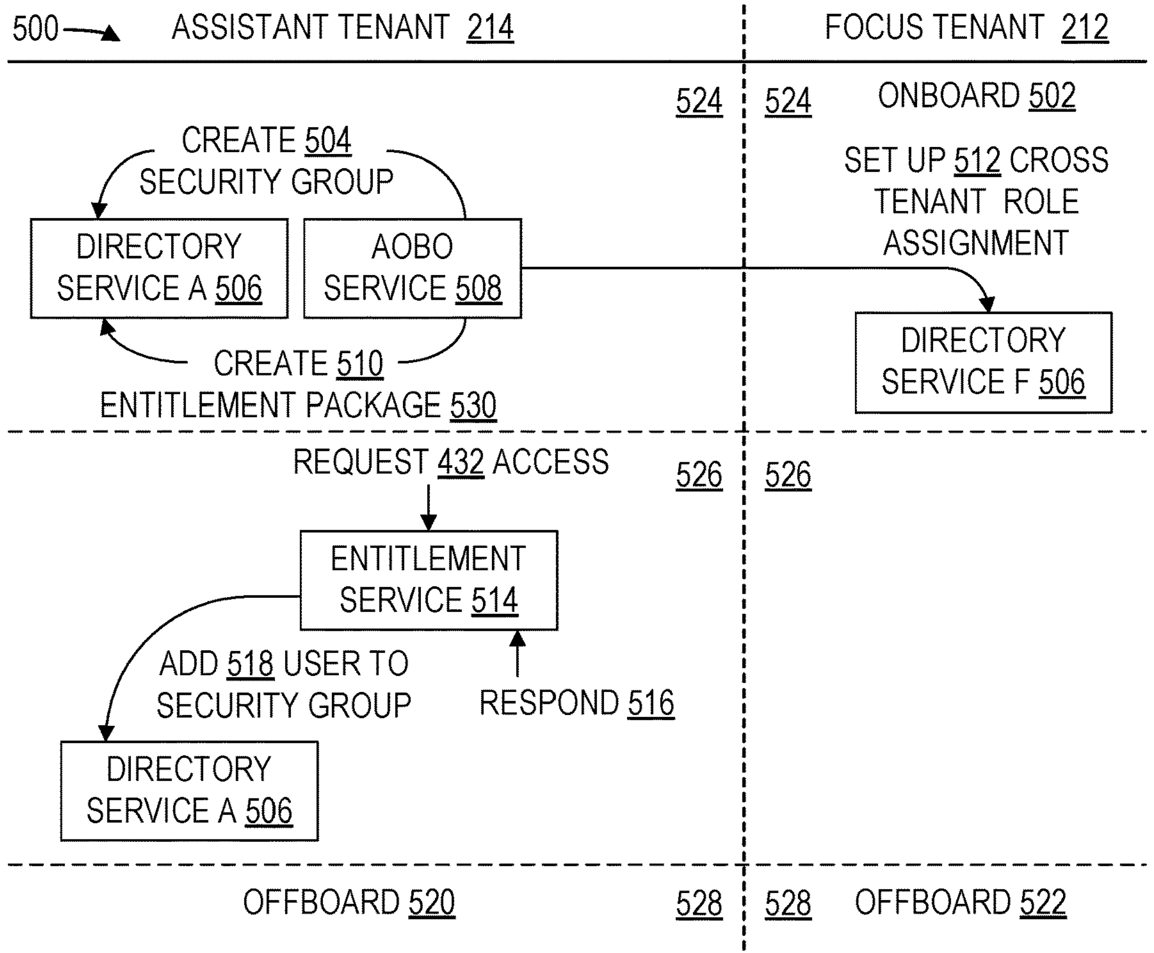
FIG. 5 is a data flow diagram illustrating aspects of some SCTA functionality.

FIG. 5 shows some aspects of data flow to, from, or between items that include directory services 506, an entitlement service 514, and an AOBO (action on behalf of, a.k.a. administrate on behalf of) service 508. This is not a comprehensive summary of all additional aspects of assistant tenants 214, 124 or focus tenants 212, 124 or clouds 136. FIG. 5 items are discussed at various points herein, and additional details regarding them are provided in the discussion of a List of Reference Numerals later in this disclosure document.

Figure 6:
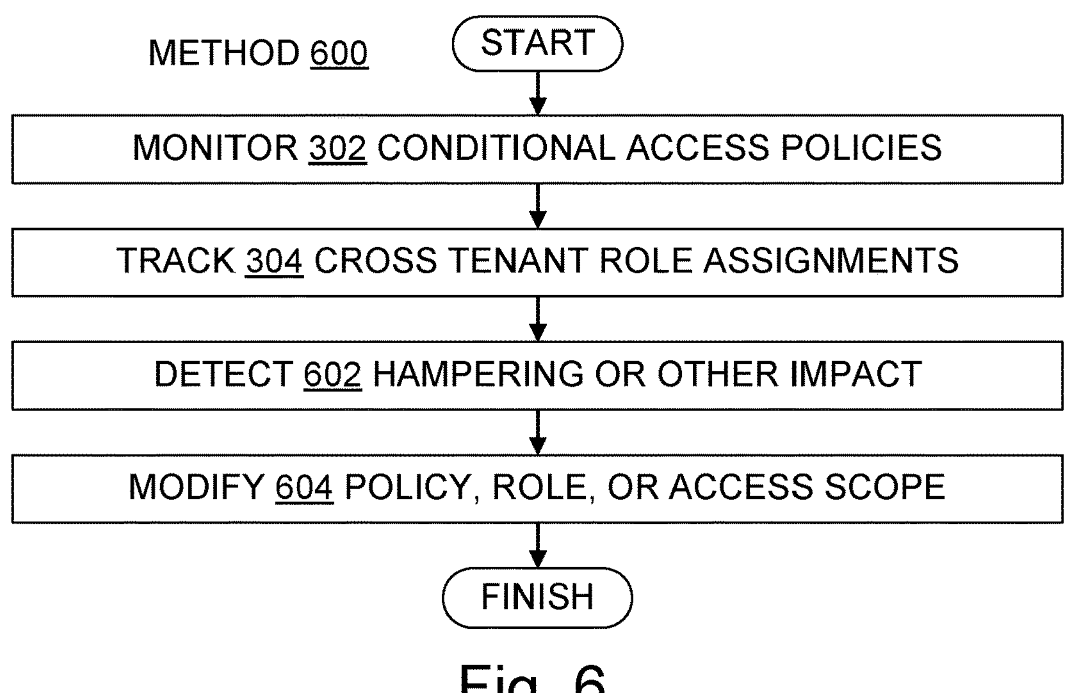
FIG. 6 is a flowchart illustrating steps in a secure cross-tenant access method.
Figure 7:
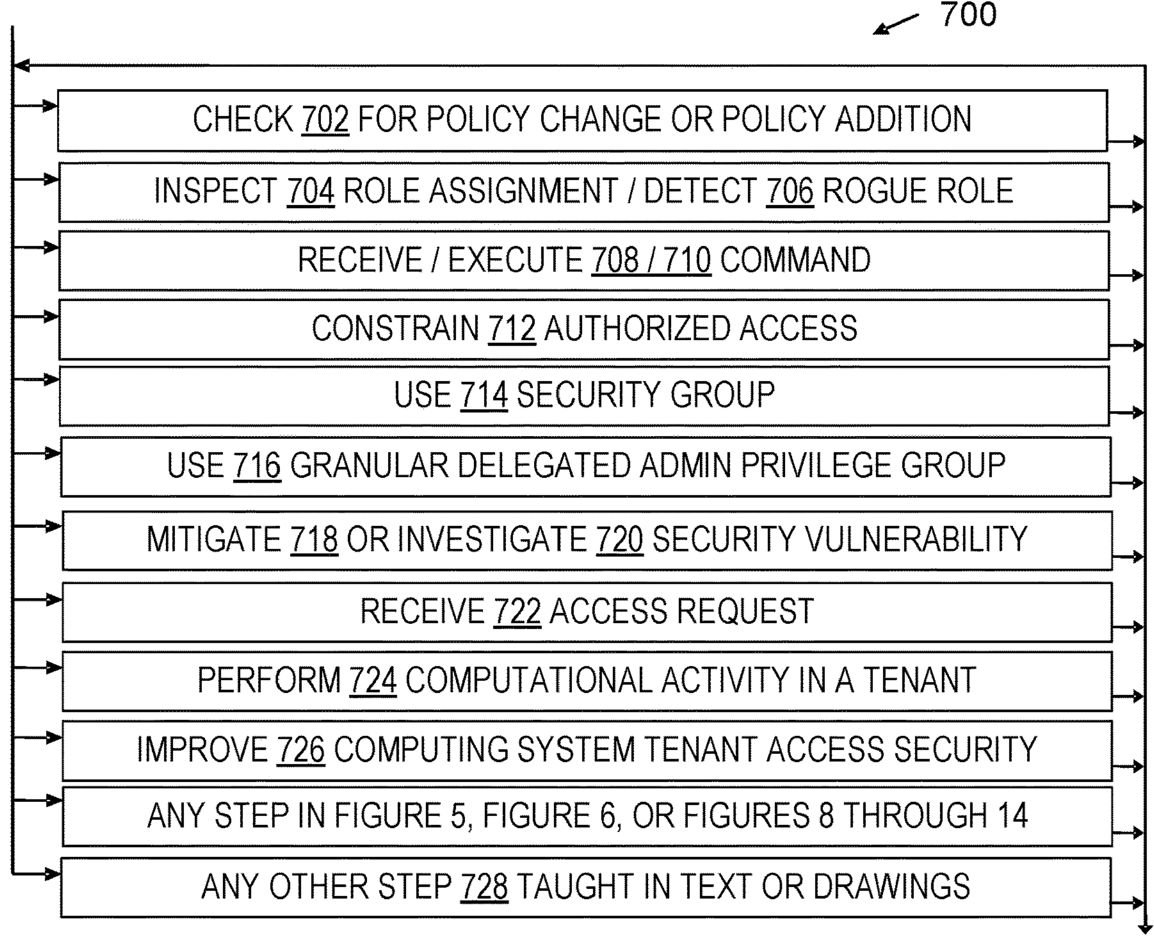
FIG. 7 is a flowchart further illustrating steps in some secure cross-tenant access methods, and incorporating FIGS. 6 and 5.

The other figures are also relevant to systems 202. Along with FIG. 5, FIGS. 6 and 7 illustrate methods of functionality 204 operation in systems 202.

In some embodiments, the enhanced system 202 is networked through an interface 328. In some, an interface 328 includes hardware such as network interface cards, software such as network stacks, APIs, or sockets, combination items such as network connections, or a combination thereof.

Some embodiments include a computing system 202 which is configured for secure cross-tenant access. The computing system includes: a digital memory 112, and a processor set 110 including at least one processor, the processor set in operable communication with the digital memory. The processor set is configured to execute a secure cross-tenant access method 700 which includes at least one of: detecting 602 a conditional access policy 402 hampering change 444 and alerting 306 in response to said conditional access policy hampering change detection, detecting 602 a hampering conditional access policy addition 446 and alerting 306 in response to said hampering conditional access policy addition detection, or detecting 602 a cross tenant role assignment 408 hampering change 444 and alerting 306 in response to said cross tenant role assignment hampering change detection. The conditional access policy hampering change is a change which hampers 310 an authorized access 308 to a focus tenant 212 by a user from an assistant tenant 214. The hampering conditional access policy addition is an addition of a conditional access policy which hampers 310 the authorized access to the focus tenant by the user from the assistant tenant. The cross tenant role assignment hampering change is a change which hampers 310 the authorized access to the focus tenant by the user from the assistant tenant.

Some embodiments include a case management subsystem 312 which resides in the assistant tenant and includes an interface 328 that is configured to receive 722 a request 432 for the authorized access to the focus tenant.

Some embodiments include an audit correlation subsystem 316 which is configured to upon execution correlate 314 an assistant tenant request 432 for the authorized access to the focus tenant with a focus tenant sign-in event 132 and with a focus tenant resource 438 access event 132.

In some embodiments, a list 320 of authorized roles 318, 134 resides in the digital memory, and detection 602 of a cross tenant role assignment hampering change includes detection of a different role 413, 134 which is not in the access-controlled list of authorized roles.

Some embodiments include a security group 326 which resides in the assistant tenant and corresponds 714 to a non-hampering cross tenant role assignment 408 in the focus tenant.

Some embodiments include a scenario analysis subsystem 324 which is configured to upon execution perform a scenario analysis 322 based on at least a conditional access policy scope 404 and an authorized access scope 436 of the authorized access 308 to the focus tenant 212.

Other system embodiments are also described herein, either directly or derivable as system versions of described processes or configured media, duly informed by the extensive discussion herein of computing hardware.

Although specific secure cross-tenant access architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of cross-tenant access functionality, for example, as well as different technical features, aspects, mechanisms, software, expressions, operational sequences, commands, data structures, programming environments, execution environments, environment or system characteristics, or other functionality consistent with teachings provided herein, and may otherwise depart from the particular examples provided.

Processes (a.k.a. Methods)

Processes (which are also be referred to as "methods" in the legal sense of that word) are illustrated in various ways herein, both in text and in drawing figures. FIGS. 5, 6, and 7 each illustrate a family of methods 500, 600, and 700 respectively, which are performed or assisted by some enhanced systems, such as some systems 202 or another secure cross-tenant access functionality enhanced system as taught herein. Method families 500 and 600 are each a proper subset of method family 700.

FIG. 5 shows three phases: an onboarding phase 524, an on-demand access phase 526, and an offboarding phase 528. Some variations on FIG. 5 include at most one of these phases, without necessarily excluding other steps not shown in FIG. 5. Some variations on FIG. 5 include at most two of these phases, without necessarily excluding other steps not shown in FIG. 5. Exclusion in this sense does not require non-performance; an excluded phase is sometimes performed by a different party, for example, and thus not included in a given embodiment. FIG. 5 items are discussed at various points herein, and additional details regarding them are provided in the discussion of a List of Reference Numerals later in this disclosure document.

Some variations on FIG. 6 exclude the monitoring step 302 or exclude the tracking step 304. Some variations include alerting 306 instead of modifying, and some include both alerting 306 and modifying 604. These are merely examples of variations; as noted elsewhere, any operable combination of steps that are disclosed herein may be part of a given embodiment.

FIGS. 1 to 5 illustrate secure cross-tenant access system 202 architectures with implicit or explicit actions, e.g., giving administrator consent, creating or providing or using or nullifying access tokens, reading and enforcing access policies, comparing role assignments, or otherwise processing data 118, in which the data 118 includes, e.g., security tokens, access policies 138, roles 134, security groups 326, access requests 423 and responses 516, and directory service 506 data, among other examples disclosed herein.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some situations a human 104 types data in response to tool 122 execution or kernel 120 execution. But no process contemplated as an embodiment herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 7. FIG. 7 is a supplement to the textual examples of embodiments provided herein and the textual descriptions of embodiments provided herein. In the event of any alleged inconsistency, lack of clarity, or excessive breadth due to an aspect or interpretation of FIG. 7, the text of this disclosure shall prevail over that aspect or interpretation of FIG. 7.

Arrows in process or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 700 action items are traversed to indicate the steps performed during a process may vary from one performance instance of the process to another performance instance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 7 to be non-operable, the sequence S is not within the scope of any claim. Any assertion otherwise is contrary to the present disclosure.

Some embodiments provide or utilize a cybersecurity method 700 for secure cross-tenant access method; the method is performed by a computing system 202. The method includes at least the following: monitoring 302 a non-hampering conditional access policy of a focus tenant, the monitoring including checking 702 for a hampering change 444 in the non-hampering conditional access policy, the monitoring also including checking 702 for an addition 446 of a hampering conditional access policy. The hampering change is a change which hampers 310 an authorized access to the focus tenant by a user from an assistant tenant. The hampering conditional access policy is a conditional access policy which hampers 310 the authorized access to the focus tenant by the user from the assistant tenant. In this example, the method also includes tracking 304 a cross tenant role assignment of the focus tenant, the tracking including inspecting 704 the cross tenant role assignment for a change in the cross tenant role assignment. In this example, the method also includes detecting 602 at least one of: the hampering change in the non-hampering conditional access policy, the addition of the hampering conditional access policy, or the change in the cross tenant role assignment. In this example, the method also includes modifying 604 at least one of the following in response to a result of the detecting: the non-hampering conditional access policy, the hampering conditional access policy, the cross tenant role assignment, or a scope of the authorized access to the focus tenant by the user from the assistant tenant.

In some embodiments, the method includes correlating 314 a focus tenant audit with an assistant tenant audit, thereby producing 314 a correlated audit 130 of activity 406 of the user in the focus tenant and activity 406 of the user in the assistant tenant.

In some embodiments, the method includes receiving 708 in the focus tenant a command 412 from the user, wherein the command is in at least one of the following command categories: security investigation commands 410, security modification commands 410, or managed service commands 418.

In some embodiments, monitoring 302 the non-hampering conditional access policy includes performing 322 a scenario analysis 322. In some embodiments, the scenario analysis includes a what-if analysis which is adapted from a tool 122 that identifies potential impact of a policy change without respect to cross-tenant access 308 scope 436.

In some embodiments, tracking 304 the cross tenant role assignment incudes detecting 706 a rogue role.

In some embodiments, the method includes constraining 712 the authorized access to the focus tenant by the user from the assistant tenant to be a zero standing 420 time bound 422 access 424. In some variations, the access 424 is constrained to zero standing but not constrained to time bound, or vice versa. Not constrained to time bound 422 does not imply perpetual; a non-time bound access can be terminated on demand by a command from an administrator.

In some embodiments, the method includes constraining 712 the authorized access to the focus tenant by the user from the assistant tenant to be access only via login from an authorized managed device 426. In some embodiments, the method includes constraining 712 the authorized access to the focus tenant by the user from the assistant tenant to be access only via login from a specific IP address range 442. In embodiment variations, none, one, two, or more of the following constraints 712 are enforced: zero standing, time bound, managed device, or IP address range.

In some embodiments, the method includes defining 716 the cross tenant role assignment in the focus tenant using 716 at least a granular delegated administrative privileges group 430.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as security groups 430, 326, directory service 506 data, services 508, 514, access requests 432 and responses 516, role assignments 408, access policies 138, audit events 132, subsystems 312, 316, 324, and SCTA software 216, in the form of data 118 and instructions 116, read from a removable storage medium 114 and/or another source such as a network connection, to form a configured storage medium. The configured storage medium 112 is capable of causing a computer system 202 to perform technical process steps for providing or utilizing SCTA functionality 204, as disclosed herein. The Figures thus help illustrate configured storage media embodiments and process (a.k.a. method) embodiments, as well as system and process embodiments. In particular, any of the method steps illustrated in FIG. 5, 6, or 7, or otherwise taught herein, may be used to help configure a storage medium to form a configured storage medium embodiment.

Some embodiments use or provide a computer-readable storage device 112, 114 configured with data 118 and instructions 116 which upon execution by a processor 110 cause a computing system 202 to perform a secure cross-tenant access method 700. This method 700 includes: alerting 306 in response to a detection 602 of a conditional access policy hampering change, alerting 306 in response to a detection 602 of a hampering conditional access policy addition, or alerting 306 in response to a detection 602 of a cross tenant role assignment hampering change, wherein the conditional access policy hampering change is a change which hampers an authorized access to a focus tenant by a user from an assistant tenant, the hampering conditional access policy addition is an addition of a conditional access policy which hampers the authorized access to the focus tenant by the user from the assistant tenant, and the cross tenant role assignment hampering change is a change which hampers the authorized access to the focus tenant by the user from the assistant tenant.

In some embodiments, the method further includes correlating 314 a focus tenant audit with an assistant tenant audit, thereby producing 314 a correlated audit of activity of the user in the focus tenant and activity of the user in the assistant tenant.

In some embodiments, the method further includes constraining 712 the authorized access to the focus tenant by the user from the assistant tenant to be a zero standing time bound access via login from an authorized managed device.

In some embodiments, the method further includes constraining 712 the authorized access to the focus tenant by the user from the assistant tenant to be a zero standing time bound access via login from a specific IP address range.

In some embodiments, the method further includes constraining 712 the authorized access to the focus tenant by the user from the assistant tenant to be access only via login from an authorized managed device and from a specific IP address range.

Some embodiments provide or utilize built-in 942 (no additional login required) analyst access to M365 Defender and similar tools 922. Some embodiments provide or utilize a cross-tenant built-in 942 access 308 to an asset in a focus tenant after authorization in an assistant tenant, with no additional login required in the focus tenant. In some embodiments, GDAP enables partners to manage access and execute workloads with minimal privileges. Using an internal tool within a service provider (e.g., a security service provider or a cloud service provider), an analyst can authenticate via GDAP and view a list of devices and users that have been excluded from participating in a managed response. The analyst can then take remedial action through an API, (e.g., Action Provider, an API layer provided by M365 Defender), without having to log in again, from the M365 Defender portal or other authorized security tool portal. This allows the analyst or other expert to respond to security threats more quickly.

Additional Observations about Secure Cross-Tenant Access

Additional support for the discussion of SCTA functionality 204 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, best mode, novelty, nonobviousness, inventive step, or industrial applicability. Any apparent conflict with any other patent disclosure, even from the owner of the present subject matter, has no role in interpreting the claims presented in this patent disclosure. With this understanding, which pertains to all parts of the present disclosure, examples and observations are offered herein.

In this disclosure, a customer tenant is an example of a focus tenant 212. The teachings are applicable to other focus tenants as well. For instance, in some scenarios there is a focus tenant that is not also a customer tenant, because no customer-provider business relationship exists between a focus tenant entity that is managing, operating, controlling, or owning the focus tenant and an assistant tenant entity that is managing, operating, controlling, or owning the assistant tenant.

Some embodiments provide or enhance a managed service technician's ability to act as an admin on behalf of a customer to mitigate incidents on the customer's tenant in a secure, compliant, auditable, and timely fashion. This ability helps keep the customer tenant and its assets secure.

Some embodiments provide or utilize an ability to monitor and alert any change to CA policy intended for the customer tenant that does not allow the authorized technician to log on to the customer's product portal.

Some embodiments provide or utilize an ability to monitor and alert in the event of a cross tenant role assignment expanding beyond the intended purposes.

Some embodiments provide or utilize an ability to provide correlated audits for all actions that the technician is involved across different systems. IN some this includes case management audit events, AAD or other directory service 506 sign-in logs, and product audit events.

Some embodiments provide or utilize an ability to request time-bound non standing access by security technicians within the context of a case management system. Some embodiments provide or utilize an ability to request time-bound standing access by security technicians within the context of a case management system.

Some embodiments provide or utilize an ability to provision time-bound cross tenant role assignment in the focus tenant.

Some embodiments provide or utilize an ability to reduce the attack surface by only allowing the technician to access the focus tenant from a secured and restricted device that is enrolled in the MEM of the assistant tenant.

Some embodiments provide or utilize an ability for technicians to log on to the customer's product portal and perform actions that enhance the security, reliability, performance, or usability of the customer's product.

Some embodiments provide or utilize an ability to provide correlated audits for all actions that the technician is involved across different systems. In some cases, these include case management audit events, directory service sign-in events, and product audit events.

Some embodiments provide or utilize an ability to monitor and alert on any changes to CA policy intended for the customer tenant that does not allow the technician to log on to the customer's product portal.

Some embodiments provide or utilize an ability to establish a trust model wherein a customer can consent to the creation of Cross Tenant Access policies and Conditional Access policies on their tenant.

Some embodiments provide or utilize an ability to expand the scope of approvers for technicians' time-bound non standing access, to be outside of the MSE tenant.

Some embodiments provide or utilize an ability to monitor and alert in the event of the Cross Tenant Role Assignment expanding beyond the intended purposes.

Some embodiments provide or utilize a case management subsystem, e.g., an enhanced Dynamics 365 Integrated Case Management System, to obtain non-standing access that leverages access management, e.g., AAD's Cross Tenant Access Management, in order to remediate security incidents and perform mitigation actions. Some of the many examples of remediation or mitigation include isolating a device, running an anti-virus scan, and retiring a device. In some embodiments, the authorized access includes activity on a security portal such as a MEM or MSE portal. Some embodiments use secured and restricted Windows 365® devices enrolled in Microsoft Endpoint Manager (MEM) of the Microsoft Experts (MSE) tenant (mark of Microsoft Corporation). Some embodiments also offer a capability to have correlated audits for all the actions that the technician will be involved in the aforementioned systems. Some embodiments also provide monitoring of Conditional Access (CA) policies in the customer tenant to prevent the customer or an intruder from blocking access to authorized technicians.

Some embodiments leverage or adapt Azure® AD sign-in security features such as an X-TAP policy trust setting wherein a customer tenant 212 trusts a compliant device 101 from an assistant tenant 214, an inbound Conditional Access to customer tenants with granular targeting (external user type and tenant scoping), and constraints that technicians access customer tenants via Windows 365® devices that are MEM enrolled in the assistant tenant 214. Some embodiments leverage or adapt Azure® AD Cross Tenant role assignments for authorization. Some embodiments leverage or adapt Azure® AD Entitlement Management (ELM) for technician Just-In-Time (JIT) access provisioning (marks of Microsoft Corporation).

In some embodiments, a customer global admin is involved in a one-time process of setting up assistant tenant AOBO artifacts such as X-TAP and Inbound Conditional Access. In some embodiments, AOBO artifacts specific to a managed service 416 will be enabled each time an admin authorizes a managed service involving SCTA.

Some embodiments provide or utilize enhancements around security, auditing, and integration with a case management system to make the solution robust and secure, and to increase usability. Some embodiments fill gaps by providing one or more of: a one-stop solution for technicians where they can request JIT access from a Case Management system; audit trails that correlate JIT requests and approval with technicians sign-in logs in customer tenant, and with audit logs showing changes in the customer tenant; a tracking system to notify technicians if any attacker or customer admin has altered the existing CA policy or created a stricter CA policy, potentially blocking technicians from login into the customer tenant; a tracking system to notify a customer admin if any technician-operated services have created Cross tenant role assignments other than what is contracted between the assistant tenant's supervisory admin or technician and the managed service customer.

The FIG. 5 diagram involves two tenants shown with vertical lanes, an assistant tenant and a focus tenant, and three phases of AOBO shown horizontally, but steps can also be divided differently. An alternate division into phases has four phases of AOBO: onboarding 524, accessing 526, access expiry (not shown in FIG. 5), and offboarding 528. Onboarding 524 and offboarding 528 involve one-time settings triggered by a customer or other focus tenant global admin.

During an onboarding phase 524 in some embodiments, the customer's global admin onboards 502 a managed service and creates X-TAP and inbound conditional access in their tenant 212. Followed by this the AOBO service 508 creates 504 security groups in the assistant tenant and sets up 512 a cross tenant role assignment in the customer tenant. In some cases, security groups are defined by role per customer, e.g., for a role of security admin and a customer Contoso, a group contoso_securityadmin is created. In some cases, set up 512 includes configuring an XTAP setting to allow service provider. In some embodiments, in order to allow JIT access to these security groups, ELM packages 530 are configured 510 in the assistant tenant. An ELM package provisions policy that provides time-bound access to the groups and requires an approver (based on the role) to approve the request.

During an on-demand access phase 526 in some embodiments, technicians go to the assistant tenant's myaccess portal or a similar portal and select a package to access. The access request 432 goes through an approval flow, resulting in a response 516 which approves or disapproves the request. After approval, technicians are granted access to the customer tenant.

During an access expiry phase in some embodiments, based on the ELM policy configuration, a technician's membership in the security group is removed. In FIG. 5, this is part of the offboarding phase.

During an offboarding phase 528 in some embodiments, the customer's global admin has the option of unsubscribing from a managed service. Then the X-TAP is de-activated and cross tenant role assignments are deleted. The customer admin is also advised to remove the X-TAP and inbound CA from their tenant 212. In some embodiments, offboarding 520 includes deleting access packages and deleting security groups. In some embodiments, offboarding 522 includes configuring the XTAP setting to not allow service provider, and deleting the cross tenant role assignment.

Some embodiments provide policy monitoring. Conditional access policies are monitored, so that if an altered policy or a stricter policy is detected in the customer tenant a notification is sent to assistant tenant technicians and they can accordingly collaborate with the customer's admin to resolve the issue.

Some embodiments provide role tracking. Cross tenant role assignments are tracked, so that the system doesn't violate the contract by creating more role assignments than contracted to between the assistant tenant vendor and the customer.

Some embodiments provide reporting to track AOBO activities using correlated audit logs. Some provide a correlated set of audit logs to track AOBO request and approval audit log in managed service, and to track activity in the customer tenant.

Some embodiments provide or utilize a cybersecurity method, including: receiving an approval of a time-bound zero standing access by an external user to an access-controlled resource of a cloud tenant, the external user not previously a user of the cloud tenant; provisioning a time-bound cross tenant role assignment for the external user in the cloud tenant; restricting the approved access to access from a secured restricted enrolled device; auditing actions of the external user within the cloud tenant during the duration of the approved access; and monitoring a conditional access policy of the cloud tenant during the duration of the approved access, and alerting in the event of an attempt to change the conditional access policy when the change would hinder the approved access.

Some embodiments include monitoring a conditional access policy of the cloud tenant during the duration of the approved access, and alerting in the event of an attempt to change the conditional access policy when the change would hinder the approved access.

Some embodiments include monitoring a cross tenant role assignment of the cloud tenant during the duration of the approved access, and alerting in the event of an attempt to change the role assignment when the change would hinder the approved access.

Some embodiments include correlation of auditing actions of the external user within the cloud tenant and actions such as the JIT request, approval, and activity during the duration of the approved access.

Some environments include a flow for AOBO access in customer tenants for managed services. In some, customer onboarding of AOBO includes these computing system steps or states in the listed sequence: software performing customer admin initiated onboarding starts, gets allowed AAD roles for a managed service, gets customer admin consent to roles, creates XTAP in customer tenant with admin token, creates a CA policy 1 in customer tenant with admin token (policy 1 blocks devices outside of a cloud PC virtual network IP range), creates CA policy 2 in customer tenant with admin token (policy 2 allows compliant managed (e.g., Windows 365® managed) devices from a certain IP range (mark of Microsoft Corporation). This customer onboarding of AOBO is followed by a background onboarding process which includes these steps or states in the listed sequence: onboarding API call, XTAP locked, security groups created in assistant tenant per customer and per role and per managed service, cross tenant role assignment in customer tenant, AAD entitlement packages created in assistant tenant per security group.

Some environments include a background CA consistency checker which runs, e.g., every hour or at another specified interval. In some, CA policy consistency checking 702 includes these computing system steps or states in the listed sequence: get baseline CA policies, get cross tenant access policy in customer tenant, compare CA policies and what-if analysis, when a CA policy change validation result indicates a pass then mark the payload as validated, or when a CA policy change validation result indicates a fail then call an ICM connector API and an ICM is created and investigation starts, e.g., with the customer admin. ICM is an Intelligent Communications Manager, which is used in some environments as an incident management service and internal tracking tool.

Some environments include a background role assignment consistency checker which runs, e.g., every hour or at another specified interval. In some, cross tenant role assignment consistency checking 704 includes these computing system steps or states in the listed sequence: get customer admin consented role assignments, get cross tenant role assignments from the customer tenant, compare role assignments, when a role assignment validation result indicates a pass then mark the payload as validated, or when a role assignment validation result indicates a fail then call an ICM connector API and an ICM is created and an investigation starts.

Some environments include a customer offboarding of AOBO that includes these computing system steps or states in the listed sequence: find all AOBO related artifacts in the customer tenant, find all AOBO related artifacts in the assistant tenant, mark XTAP for soft delete, mark cross tenant role assignment for soft delete, mark CA policies for soft delete, mark SCTA security groups in assistant tenant for soft delete, and mark SCTA entitlement access packages in assistant tenant for soft delete. Variations alter the marking order, or include concurrent marking, or both.

Some environments include a background offboarding phase after the customer offboarding of AOBO. This background offboarding includes these computing system steps or states in the listed sequence: disable XTAP in customer tenant, delete cross tenant role assignment in customer tenant, delete SCTA security groups in assistant tenant, delete SCTA entitlement access packages in assistant tenant, notify customer admin by email or otherwise to delete CA policies.

Some environments include a process for auto access with a reader role, which includes these computing system steps or states in the listed sequence: a case is assigned to a SOC (security operations center), find customer consented AAD reader role for the managed service, find correct entitlement access package for the AAD role in the assistant tenant, request access on behalf of the SOC, request is auto approved, poll entitlement management API to get time left for access.

Some environments include a process to request access for higher privileged roles, which includes these computing system steps or states in the listed sequence: SOC requests for a specific role in the customer tenant, process ends if request is denied otherwise case is assigned to SOC user, find correct entitlement access package for the AAD role in the assistant tenant, request access on behalf of the SOC and perform audit flow described below, pass control to AAD entitlement management logic app, send notifications to approver group and case management system, and pass control to approver flow.

In the approver flow, an approver receives notification over a communication platform, e.g., Microsoft Teams® platform (mark of Microsoft Corporation), or a case management system, and then approves or denies the access request, in a response notification via the platform or case management system or both. The request and response are logged by the system for auditing.

In a requestor customer tenant access flow, the requestor (e.g., SOC), receives notification. If access is approved, the requestor logs into the customer tenant and the computing system performs actions on different resources in the customer tenant, e.g., via a System for Cross-Domain Identity Management (SCIM), and then the customer tenant access flow ends. The actions are logged by the system for auditing.

Some environments include an audit log access process, which includes these computing system steps or states in the listed sequence. In one path, in which a customer views correlated 314 audit logs, software operating on behalf of a customer admin performs a role-based access control (RBAC) check, filters logs by customer ID and date, and feeds the result to a correlation query engine. In another path, software operating on behalf of a managed service admin performs a managed service RBAC check, filters logs by managed service and date, and feeds the result to the correlation query engine. The correlation query engine feeds a centralized audit storage, which also receives optionally audit enriched log data from activities in the focus tenant and the assistant tenant.

Additional Observations about Asset Exclusion

Additional support for the discussion of cross-tenant access asset exclusion (CTAAE) functionality 204 herein is provided under various headings. However, it is all intended to be understood as an integrated and integral part of the present disclosure's discussion of the contemplated embodiments, including SCTA embodiments.

Some embodiments provide CTAAE functionality 204 for managed service personas 940, such as accounts 105 belonging to analysts or other experts, to perform remediation actions on non-excluded assets 830 configured by customer administrators 104.

A "remediation action" 908 is a computational activity in a computer system which is directed at reducing, preventing, or mitigating an identified or suspected cybersecurity risk (e.g., a risk to confidentiality, integrity, availability, or privacy), or directed at investigating the cause of a cybersecurity incident, or directed at identifying or mitigating an identified or suspected cybersecurity vulnerability or cybersecurity threat.

In some scenarios, providing a managed response 908 to a security incident, for example, includes taking remedial actions in a focus tenant 212. Taking remedial actions without sufficient knowledge of the focus tenant environment or processes poses a degree of risk. An inadvertent action, such as isolating a business-critical server or resetting the credentials of an executive's account, can have an adverse business impact.

In some situations, assistant tenant 214 personnel can provide a so-called "guided response" set of remedial actions through step-by-step instructions to focus tenant 212 personnel, e.g., when permission are not given that would allow more direct cross-tenant action. In some other situations, assistant tenant 214 personnel do have sufficient permissions to directly perform remedial actions in the focus tenant 212, as part of a so-called "managed response". For example, in some scenarios a managed response includes direct remedial actions in a focus tenant customer's M365 D (Microsoft 365® Defender™) portal via a GDAP relationship with an Azure® Active Directory® (AD) Security Operator role. with access to all the focus tenant assets. In many cases, a managed response is a faster and more effective option. However, having access to all assets without any scoping of excluded assets permits actions that can have an adverse impact on the customer's business, such as isolating a business-critical server or resetting the credentials of an executive's account.

Accordingly, in some embodiments an asset 830 exclusion list 828 specifies assets, e.g., devices 101 and user accounts 105 which are excluded from access via cross-tenant access capabilities, e.g., SCTA capabilities.

In some embodiments, granular delegated admin privileges (GDAP) serve as a mechanism for managing responses while respecting exclusion lists. GDAP enables two organizations to establish relationships through Cross Tenant Access Policy and Cross Tenant Role Assignments, e.g., Azure® AD built-in roles.

In some embodiments, GDAP is enhanced to offer a means of establishing a scoped relationship, specifically with respect to a role, e.g., an Azure AD built-in role, and a specific access level of assets, e.g., M365 Defender assets.

In some embodiments, CTAAE capability 204 enables a customer admin to define a group 828 of excluded assets within the customer tenant (e.g., a resource tenant) to prevent users of a home tenant (e.g., assistant tenant) from taking any actions against those assets.

In some embodiments, CTAAE capability 204 prevents a non-tenant user with delegated privilege from accessing an excluded asset. For instance, in some scenarios CTAAE capability 204 prevents a third party administrator account, which has delegated credentials to access a tenant environment for a limited purpose, from accessing an asset (e.g., a device, an account, etc.) that is on an exclusion list controlled by a tenant administrator.

In a given embodiment, the group 828 of excluded assets includes one or more of: excluded devices, defined, e.g., using a security device group 810 such as a Microsoft Defender for Endpoint device group; excluded users, defined, e.g., using a security group 818 such as an Azure AD security group; or excluded mailboxes, defined, e.g., using a security group 326 such as an Azure AD security group.

Figure 8:
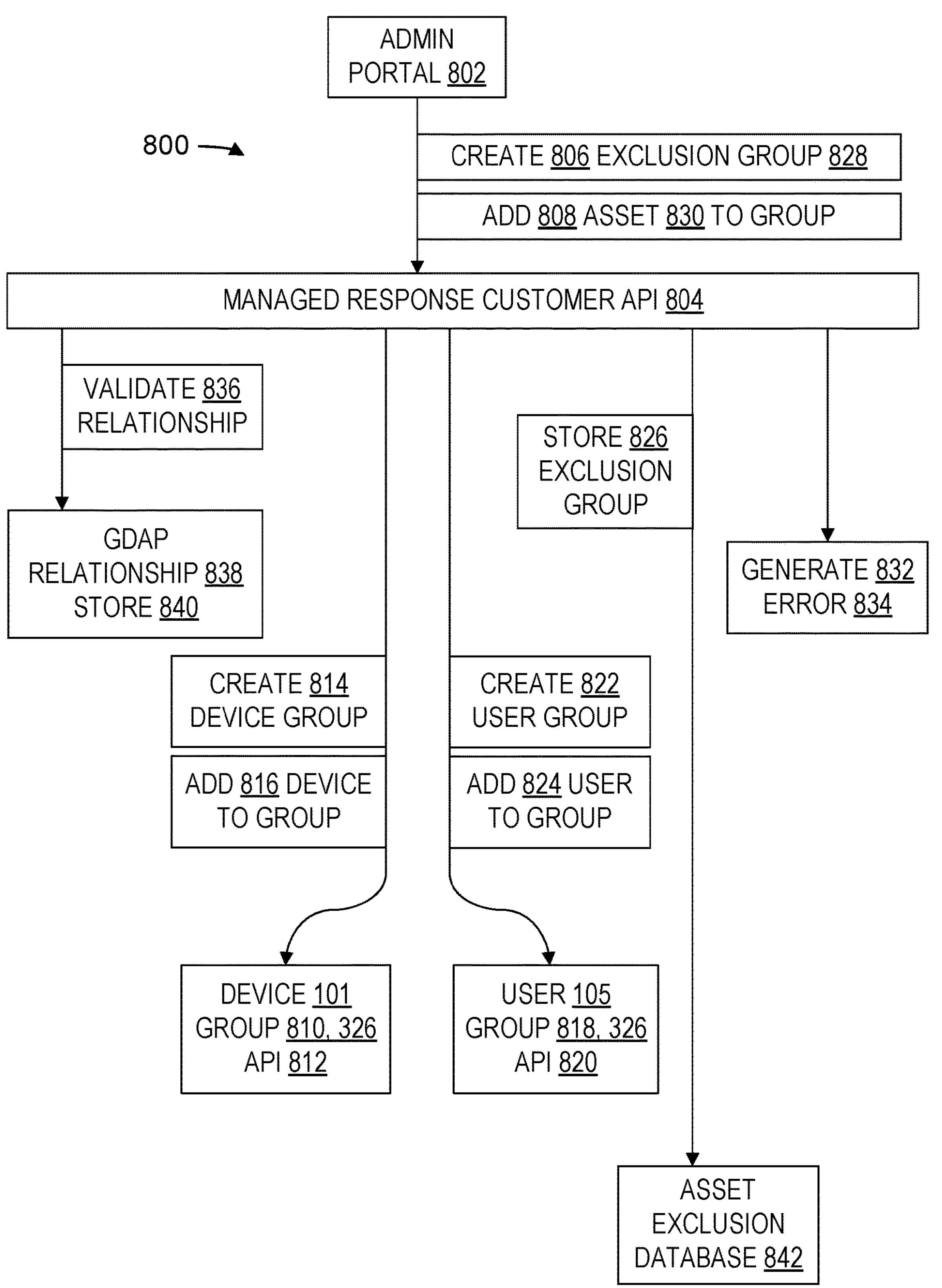
FIG. 8 is an architecture data flow diagram illustrating a focus tenant (e.g., customer) architecture for defining asset exclusions.

FIG. 8 shows a CTAAE architecture 800, 204 which is configured to perform computational activities allowing a customer admin to setup an excluded asset group and assign assets to the group. Asset exclusion groups 828, such as groups implemented with device groups 810 or user account groups 818, or both, are created 806 and populated 808 on demand or proactively, e.g., during onboarding or post onboarding.

In an example of architecture 800 operation, a customer admin 104 utilizes an admin portal 802, such as a Microsoft Defender Experts (DEX) customer admin portal. Per commands from the portal, an embodiment creates 806 one or more asset exclusion groups 828, and adds 808 one or more assets 830 to the group(s). In the example, group creation 806 and asset addition 808 are accomplished via invocation of routines in a managed response customer API 804, which may be implemented, e.g., as a Microsoft Graph™ API (mark of Microsoft Corporation). Although not illustrated, one or more other operations are also supported via API 804 in some embodiments, such as removing an asset from a group, moving an asset to a different group, duplicating a group, merging two groups, or splitting a group into two groups. Some embodiments also support a license validation step, e.g., communications with a provisioning store such as a DEX provisioning store to validate a relevant license, such as a DEX license.

In the example, an API layer 804 routine validates 836 the membership 838 of an asset in an exclusion group (e.g., with Microsoft Defender Experts). For instance, some embodiments validate 836 a DEX GDAP relationship 838 using a DEX GDAP relationship store 840.

In the example, an API layer 804 routine creates 814, 806 one or more device asset exclusion groups 810, 828, and adds 816, 808 one or more device assets 101, 830 to the device exclusion groups 810. This is accomplished in some embodiments using a device group API 812, e.g., a Microsoft Defender Endpoint (MDE) device group API.

In the example, an API layer 804 routine creates 822, 806 one or more user asset exclusion groups 818, 828, and adds 824, 808 one or more device assets 101, 830 to the user identity exclusion groups 818. This is accomplished in some embodiments using a user group API 820, e.g., a Microsoft Azure AD security group API, implemented, e.g., as a Microsoft Graph™ API.

In the example, an API layer 804 routine stores 826 the exclusion groups 828 in an asset exclusion database 842.

In some embodiments, managed service personas 940 such as assistant tenant analyst personas, are permitted by the embodiment to only act on assets 830 that have not been excluded from access by their presence in an exclusion group 828. For example, in some scenarios managed personas performing a managed response can act on a Microsoft Defender 365 asset only if the asset in not identified in any exclusion list.

However, in some embodiments and scenarios, a person is given access to any non-excluded asset within a specified group of security assets of a focus tenant (e.g., Microsoft Defender 365 assets) without logging in to the focus tenant. This allows an analyst in a home tenant 214 (e.g., Microsoft Defender Experts) to take remedial action (e.g., as part of a Managed Response) from an internal tool, without having to log in to the customer 212 portal, but only for action on non-excluded assets. In some embodiments, an API layer 804 integrates with a remedial actions API (e.g., the Microsoft 365 Defender remedial actions API), validates 836 the membership of an asset in an exclusion group (e.g., with Microsoft Defender Experts), and generates 832 an authorization error 834 if the asset belongs to any exclusion groups.

Figure 9:
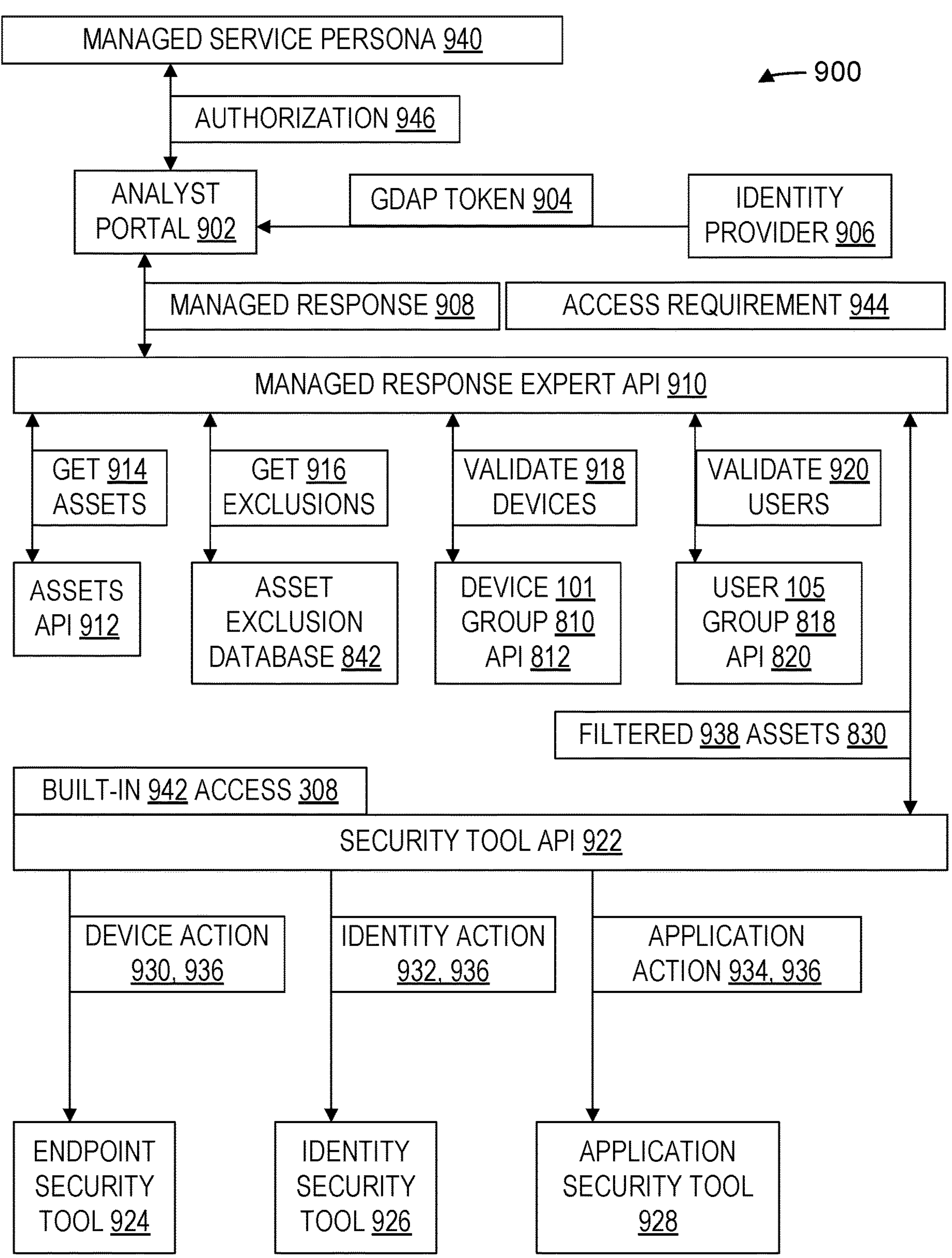
FIG. 9 is an architecture data flow diagram illustrating an assistant tenant (e.g., home) architecture for enforcing asset exclusions.

FIG. 9 shows a CTAAE architecture 900, 204 which is configured to complement the architecture 800. However, a given embodiment may employ architecture 800 only, architecture 900 only, both architectures 800 and 900, or other architecture(s) that provide the CTAAE functionality discussed herein, e.g., GDAP with exclusion groups 828 in a SCTA architecture.

In an example of architecture 900 operation, an analyst 104, such as an XDR SOC analyst, utilizes an analyst portal 902, such as a DEX analyst portal. XDR stands for Extended Detection and Response, SOC stands for Security Operations Center, and DEX stands for Defender Experts. The example embodiment gets a GDAP token 904 from an identity provider 906, such as a customer tenant Azure AD service. The analyst portal sends managed response 908 commands and data to a managed response expert API 910, which gets 914 the relevant assets 830, e.g., all assets 830 implicated in an incident, using an assets API 912. In this example, the managed response expert API 910 also gets 916 the asset exclusions, e.g., one or more exclusion groups 828 for the customer tenant, from the asset exclusion database 842. In this example, the managed response expert API 910 also validates 918 device membership or lack thereof in any device exclusion groups 810, and filters assets accordingly to prevent access to excluded devices, using the device group API 812, e.g., an MDE device group API. MDE stands for Microsoft Defender for Endpoints. In this example, the managed response expert API 910 also validates 920 user membership or lack thereof in any user exclusion groups 818, and filters user accounts and other user-specific assets (e.g., mailboxes) accordingly to prevent access to excluded user assets, using the user group API 820, e.g., an Azure AD security group membership API.

In this example, identification of the filtered 938 assets 830 is sent to a security tool 922, such as a Microsoft 365 Defender API. In some embodiments, filtering 938 produces an allow-list of assets 830 to which access is allowed, and embodiments, filtering 938 produces a deny-list of assets 830 to which access is denied. Accordingly, in some embodiments, an exclusion group 828 has as its member the identities of assets 830 to which access is allowed and if an asset is not identified in such an allow-list then access will be denied to the analyst (i.e., to the remedial operation sought by the analyst). In other embodiments, an exclusion group 828 has as its member the identities of assets 830 to which access is not allowed and if an asset is not identified in such a deny-list then access will be allowed to the analyst (i.e., to the remedial operation sought by the analyst).

Continuing the example of architecture 900 operation, the security tool 922 attempts to cause one or more remedial actions 936, such as a device action 930 by an endpoint security tool 924, e.g., MDE, an identity action 932 by an identity security tool 926, e.g., Microsoft Defender for Identity (MDI), or an application action 934 by an application security tool 928, e.g., Microsoft Defender for Application (MDA) or Microsoft Defender for Office (MDO).

In some scenarios, a customer global admin has to explicitly turn on this CTAAE functionality 204 through an API or a UI; CTAAE functionality 204 is not necessarily on by default in a given embodiment.

Accordingly, some embodiments utilize or provide an enhancement which includes a managed response API that integrates with a Microsoft 365 Defender API or other security tool API for remedial actions and validation of device group and identity security group membership. In some scenarios, the assets subject to exclusion controls described herein include enrolled devices, user accounts, mailboxes, or a combination thereof. Some embodiments utilize or provide a method for customer administrators to establish an exclusion list of assets for Managed Service Personas from a separate tenant. Some embodiments utilize or provide a method for customer administrators to establish the exclusion list per external tenant. Some embodiments utilize or provide a system for Managed Service Personas, such as analysts, to execute remedial actions (e.g., Managed Response) on a customer's security tool assets from the analyst's tooling without requiring the analyst to log into the customer's security tool portal. For example, manages service personas have authentication tokens or another standing authentication in some embodiments, which is limited to security tool access authentication. Some embodiments utilize or provide a system for Managed Service Personas, such as analysts, to execute remedial actions solely on assets authorized by customers and not on any other assets.

Some embodiments are suitable for utilization by experts, e.g., in a cloud services provider SOC, or by customers (a.k.a. clients, e.g., tenants) of security services managed by such experts. For example, in some Microsoft environments, Defender Experts for XDR: Managed Response is a functionality feature that provides customers with an ability to augment their security operations center (SOC). In some scenarios, this feature is part of a Microsoft Defender Experts for XDR (XDR Experts) managed detection and response service, which extends beyond the endpoint to provide detection and response across Microsoft 365 Defender data.

Although Microsoft technology is used in this example, similar technology from other providers is also amenable to optimization by applying the teachings presented herein.

With Managed Response, customers can list the devices and users that they want excluded, either during onboarding or later on via settings. This allows Defender Experts analysts to take remediation actions on behalf of their customers and mitigate the threat. For the excluded devices and users, unless the scenario's tools are configured otherwise, analysts would continue to offer the necessary guidance which the customer SOC analyst or CISO can act upon.

In this example, customers can exclude devices or users by adding them to Defender for End point Device groups or Azure Active Directory User groups. Customers can also automatically exclude (a) any device that they have identified as High Value Device on Defender for End point or another security tool, or (b) any users identified as Sensitive on Defender for Identity or another security tool, or (c) as any user accounts identified as a Priority account on Defender for Office 365 or another security tool.

In some embodiments, a user interface states an explanation such as "Remediation exclusions: These devices and users will be excluded from remediation actions taken by Defender Experts." In some embodiments, the user interface also provides one or more of: buttons, check boxes, search term input boxes, device group name lists, device group size counts, user group name lists, user group size counts, and similar user interface mechanisms and contents, in order to facilitate creation or modification of exclusion lists.

In some embodiments, customers can consult with Defender Experts or other experts or SOC personnel via a live chat feature of the user interface during specified times (e.g., 24/7/365) to discuss specific incidents or alerts.

In some embodiments, a Managed Response that Defender Experts or other experts or SOC personnel have completed or at least offered as guidance to the customers can be viewed from a portal interface (e.g., the M365D portal) and by clicking on a View Managed Response link on an incident home page.

For example, in some scenarios, upon invoking a Managed Response side panel, the customer will be able to access an investigation summary, a list of actions completed, and a list of any pending actions that are waiting for the customer to act upon or authorize, e.g., a customer CISO role action or authorization. CISO stands for chief information security officer. The customer CISO can then follow the instructions for the pending actions and complete them accordingly to mitigate the threat and resolve the incident. The actions could be 1-click actions that can be completed with a click of a button (e.g., an Isolate device action in some tools), or more complex actions (e.g., a Reset user password in some tools).

In some scenarios, all actions are completed by the Defender Experts or other experts or SOC personnel. Accordingly, the customers will be informed via the user interface that there are no pending actions. In some cases, the user interface also notifies the customer that they can get a summary of the investigation and the completed actions, e.g., via a Managed Response Call to action button.

In short, Defender Experts for XDR: Managed Response and similar functionalities which incorporate teachings provided herein provide customers with an ability to have a managed security service that extends beyond the endpoint. This allows for a more comprehensive view of their security operations, and an ability to respond to incidents more effectively. Additionally, in some embodiments the scope of these actions extends across various workloads such as office productivity software assets and identity assets in addition to endpoint assets. Security functionality 204 enhanced according to the teachings herein is a valuable addition to any organization's security operations. Among other benefits, it provides customers with the ability to have a managed security service that extends beyond the endpoint, allowing for a more comprehensive view of their security operations and the ability to respond to incidents more effectively.

Some embodiments provide or utilize GDAP with an asset exclusion list. In some embodiments, device exclusion is implemented as group-based exclusion or as high-value asset tags, or both. In some embodiments, customers can create group-based exclusions in a security tool, e.g., the M365 Defender portal, allowing them to specify which device and/or user groups will be excluded. In some embodiments, high-value asset tags from M365 Defender or other security tools are repurposed for use in defining exclusion groups.

When an analyst tries to remediate an incident involving a specific asset or user, GDAP is used to query a device API (e.g., a Machine API) for devices and/or to query an identity API (e.g., a Graph API) for users, in order to map the asset or user to any known group. This information is then compared against the exclusion groups that the customer has defined as excluded.

Additional Observations about Product-Specific Roles

Additional support for the discussion of cross-tenant access product-specific role (CTAPSR) functionality 204 herein is provided under various headings. However, it is all intended to be understood as an integrated and integral part of the present disclosure's discussion of the contemplated embodiments, including SCTA embodiments.

Some embodiments allow external users (users outside an organization) to access organizational data in a secure and authorized manner. Some provide a solution for product-specific Role Based Access Control (RBAC) support integrated with Granular Delegated Admin Privilege (GDAP). In particular, some embodiments provide or utilize workload cross-tenant product role assignment for GDAP, some embodiments provide or utilize GDAP login to customer tenants with workload custom roles, calculating permissions, and RBAC enforcement, and some embodiments provide or utilize both cross-tenant product role assignment for GDAP and the login, permissions, and RBAC aspects. Some embodiments bring product specific RBAC to a secure cross tenant access solution, via a token exchange mechanism.

Some embodiments with product-specific RBAC differ from more general RBAC by recognizing and enforcing different kinds or levels of access for different products even within a single role such as machine admin, network admin, global customer admin, CISO, internal analyst, external analyst, SOC analyst, and so on.

Figures 10, 13:
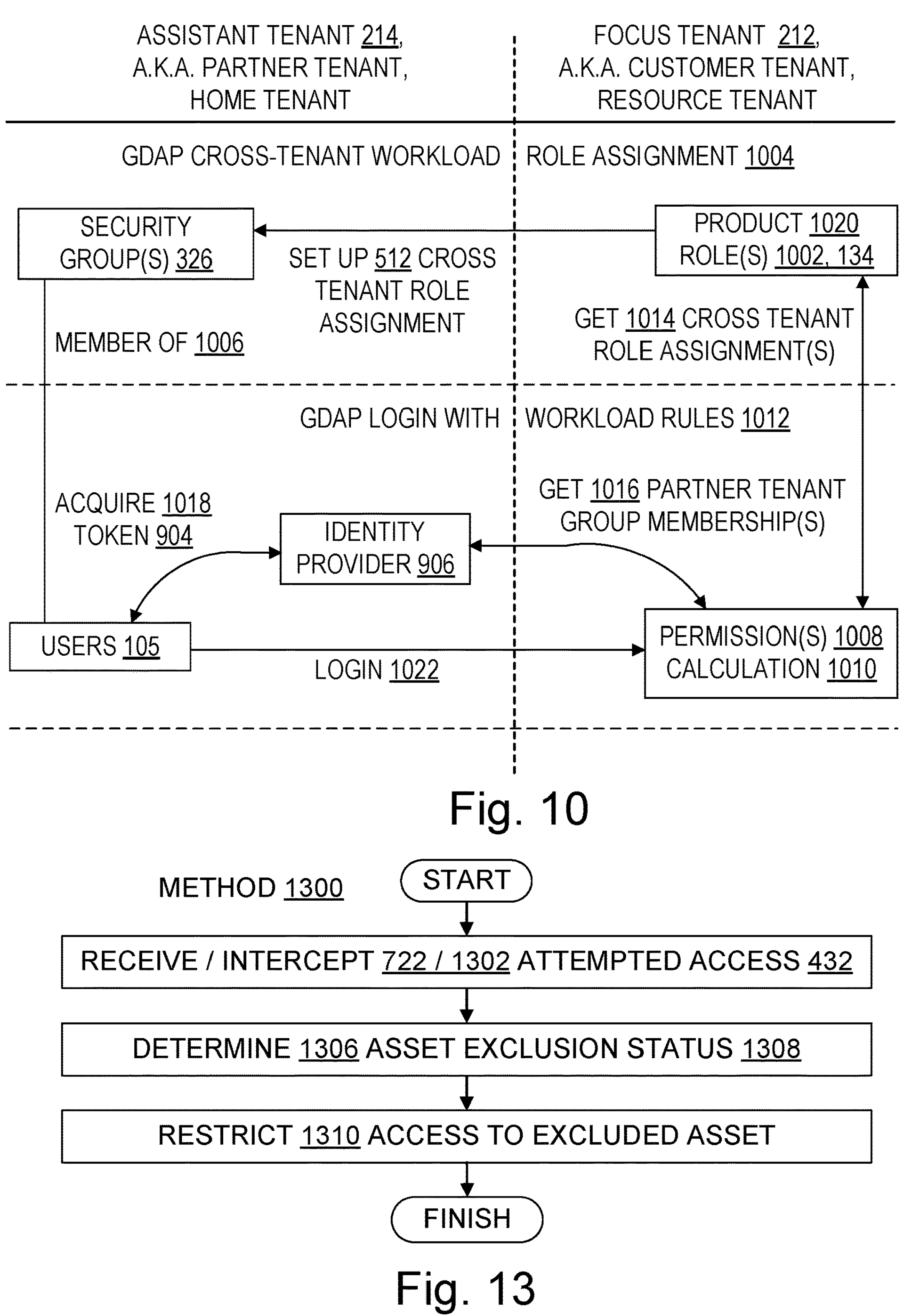
FIG. 10 is an architecture data flow diagram illustrating an architecture for setting up and using workload rules for role based access control.
FIG. 13 is a flowchart further illustrating steps in a secure cross-tenant access method which utilizes an asset exclusion group.

FIG. 10 shows a CTAPSR architecture 1000, 204 which provides a solution for products 1020 to support GDAP workload rules using custom roles of different products and using GDAP token claims (e.g., content security policy CSP or CSPV2 token claims). Some examples of products 1020 include Microsoft 365 Defender and other security tools, Microsoft Endpoint Manager (MEM) and other endpoint device management tools, Microsoft Teams® Admin center and other video conferencing administration tools. The illustrated architecture 1000 includes a GDAP cross tenant workload role assignment portion 1004 and a GDAP login with workload rules portion 1012.

In one example of operation of the CTAPSR architecture 1000, a user acquires 1018 a token 904 from an identity provider 906, e.g., an Azure AD identity provider. The user is a member of 1006 at least one security group. Then the user logs 1022 into a customer tenant, using the token. A permissions calculation software component 1010 gets 1014 cross-tenant role assignments 1002 and gets 1016 partner tenant group memberships, e.g., from a customer tenant store or service, and calculates user permissions 1008 accordingly. In some scenarios, a customer tenant has previously installed or otherwise configured a cross tenant access policy for the partner tenant (a.k.a. home tenant).

Some embodiments utilize or provide an API 1104 to create 512 or update 1116 a workload cross tenant role assignment. This API will allow role assignment between product specific RBAC roles and security groups in the partner tenant. For example, in some scenarios Microsoft 365 Defender unified RBAC roles are assigned to a security group in the home tenant. In some embodiments, role assignments are stored 1106 in the context of customer tenant 212, however, the security groups 326 are from the partner tenant 214, as illustrated in FIG. 10.

With regard to validation, in some embodiments ross tenant role assignments are only allowed if an X-TAP policy is in place in the customer tenant for the given partner tenant. In some embodiments, only security groups (not users or other principals) of home tenants are allowed to be assigned to the role of cross tenant role assignment. In some embodiments, only a secured app with special permission can perform cross tenant role assignment. Some embodiments provide or utilize a get cross tenant role assignment API which will allow role assignment between product specific RBAC roles and groups of the partner tenant (in some embodiments, an API consists of, or in some includes, one or more routines). Some embodiments provide or utilize a delete cross tenant role assignment API.

In some scenarios, a customer global admin 1102 has to explicitly turn on this CTAPSR functionality 204 through an API or a UI; CTAPSR functionality 204 is not necessarily on by default in a given embodiment.

Figure 11:
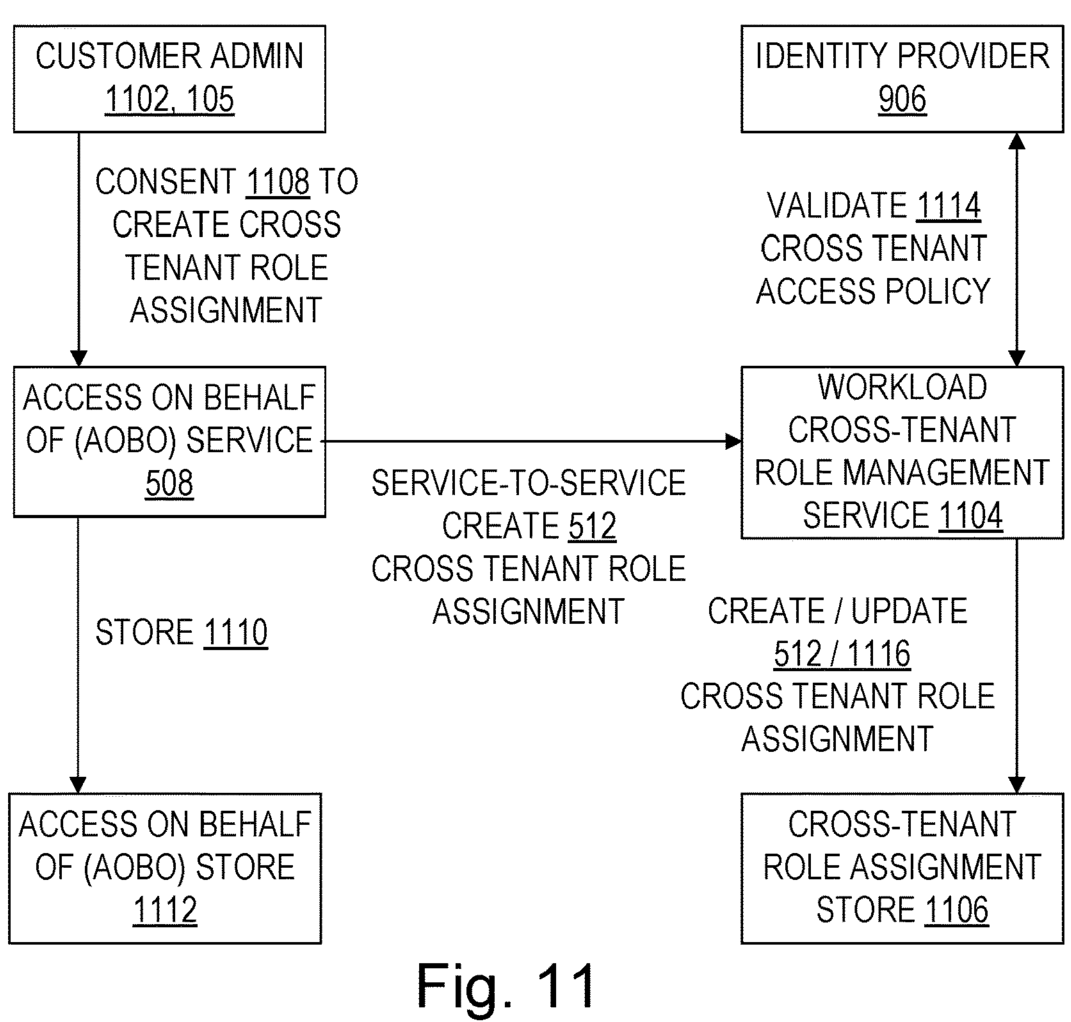
FIG. 11 is a data flow diagram illustrating an architecture for setting up cross tenant role assignments.

FIG. 11 shows a CTAPSR architecture 1100, 204 which in operation communicates a consent 1108 of a customer admin to an AOBO service 508 to creation of a cross tenant role assignment. In some embodiments, the AOBO service 508 operates as part of or in conjunction with a SOC or a security tool such as a Microsoft Defender Experts center or tool, or a Microsoft Defender Partner center or tool. The consent 1108 is stored 1110 in a store 1112, e.g., a database. Service-to-service communications between the AOBO service 508 and a workload cross tenant role management service 1104 result in creation 512 of the cross tenant role assignment. Validation 1114 is performed via communications with an identity provider 906, e.g., an Azure® Active Directory® (AD) service 906. The validated cross tenant role assignment is created 512 or updated 1116 in a store 1106 by the workload cross tenant role management service 1104.

Figure 12:
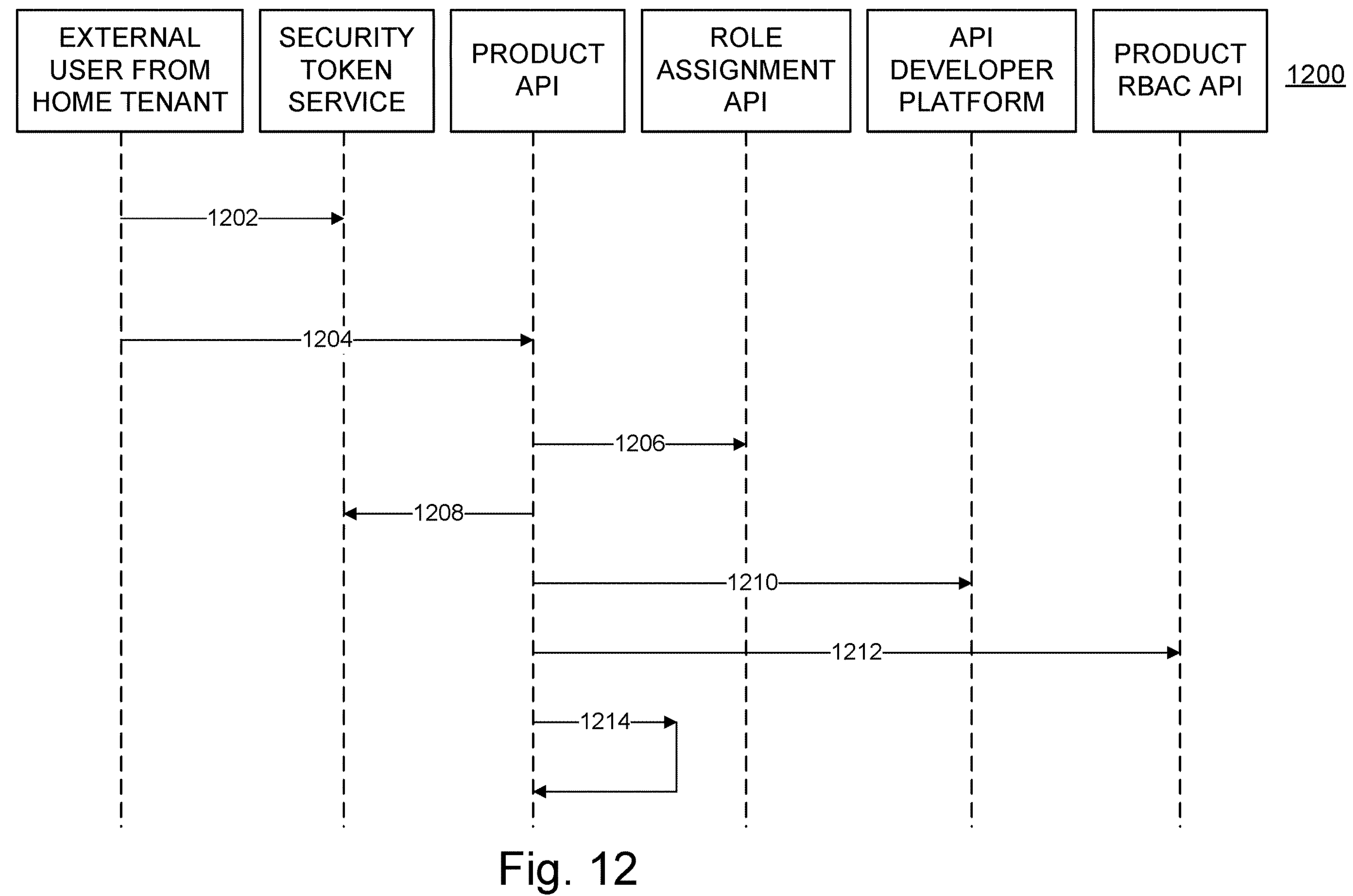
FIG. 12 is a data flow diagram illustrating obtention and enforcement of product-specific role based access control rules in an architecture.

FIG. 12 shows an operational diagram, 1200 of a CTAPSR architecture 204, such as one consistent with FIGS. 10 and 11 or another CTAPSR architecture 204 consistent with teachings presented herein. External user from home tenant is, e.g., an expert or analyst 105. Security token service is, e.g., Azure ESTS (Evolved Security Token Service) or a similar security service. Product API is, e.g., a Microsoft 365 or other product API. Role assignment API is, e.g., an AOBO service API or cross tenant role management API or combination thereof. API developer platform is, e.g., Microsoft Graph™ or another platform for integration of services and devices. Product RBAC API is, e.g., a Microsoft 365 or other product RBAC API. In step 1202, the external user acquires a token, e.g., a CSP version 2 token. In step 1204, the external user authenticates to a product API. In step 1206, the product API checks to see if a role assignment exists for the home tenant. In step 1208, the security token service gets an on-behalf-of (OBO) token. In step 1210, the product API checks a security group membership of a role assignment in the home tenant. In step 1212, the product API gets an effective role membership. In step 1214, the product API enforces role-based access accordingly.

Some embodiments validate that cross tenant role assignments exist and check if the token in context is, e.g., a CSPV2 token. If yes, the embodiment checks if a partner-specific workload role assignments setting is turned on. If yes, it retrieves cross tenant role permissions from a cross tenant role assignment store.

Some embodiments calculate cross tenant role permission and scopes as follows. If a partner specific workload role assignments setting is turned on, the embodiments use the logged-in external user's token (a.k.a. GDAP or CSPV2 token) to get an on behalf of (OBO) token in the context of the partner tenant. From the role assignment store, the embodiments find the cross-tenant role assignment and partner tenant's security group for the given customer tenant. The embodiments call an integration platform (e.g., Microsoft Graph MemberOf (cached for performance improvement)) to check if the logged-in user is a member of these groups using the OBO token obtain in a step above. The embodiments calculate permissions based on group memberships and roles found in steps above.

In some scenarios, embodiments provide product-specific role based access control functionality which extends RBAC enforcement of product workloads without modifying the code that implements the legacy (non-product-specific-role) RBAC enforcement.

Some embodiments utilize or provide a cybersecurity method 1300 for focused secure cross-tenant access, including: receiving 722 or intercepting 1302 an attempted access 432 to an asset during a remediation action; determining 1306 based on at least an exclusion group whether the asset is or includes an excluded asset; and in response to determining 1306 that the asset is or includes an excluded asset, barring 1310 cross-tenant access to the excluded asset or imposing 1310 an additional access requirement 944 on cross-tenant access to the excluded asset.

Some embodiments utilize or provide a cybersecurity method 1400 for focused secure cross-tenant access, including: receiving 722 or intercepting 1302 an attempted access 432 to an asset during a remediation action; determining 1406 a status of the asset pursuant to a product-specific role 1002; and in response to determining 1306 that the asset is or includes an asset covered by the product-specific role 1002, enforcing 1410 access to the asset based on the product-specific role 1002. Enforcement 1410 includes barring 1310 cross-tenant access to the covered asset, imposing 1310 an additional access requirement 944 on cross-tenant access to the covered asset, or allowing access to the covered asset, as dictated respectively by the product-specific role 1002.

Some embodiments utilize or provide a cybersecurity method 700 for focused secure cross-tenant access 308, the method including computationally: receiving 722 an attempted access 432 to an asset 830 during a remediation action 908 or intercepting 1302 an attempted access 432 to an asset 830 during a remediation action 908; determining 1306 based on at least an exclusion group 828 whether the asset is an excluded asset or includes an excluded asset; and in response to determining that the asset is an excluded asset or includes an excluded asset, barring 1310 cross-tenant access to the excluded asset or imposing 1310 an additional access requirement 944 on cross-tenant access to the excluded asset, or both.

In some embodiments, the cybersecurity method 700 includes computationally creating 806 the exclusion group of assets or computationally modifying 806 the exclusion group of assets.

In some embodiments, the cybersecurity method 700 includes computationally creating 512 a product-specific cross-tenant role 1002 or computationally modifying 512 a product-specific cross-tenant role 1002, and computationally enforcing 1410 cross-tenant access to an asset based on at least the product-specific cross-tenant role.

In some embodiments, computationally creating 512 a product-specific cross-tenant role or computationally modifying 512 a product-specific cross-tenant role includes at least one of: utilizing 512 an access-on-behalf-of service 508; or utilizing 512 a workload cross-tenant role management service 1104.

In some embodiments, the cybersecurity method 700 includes providing 900 a cross-tenant built-in access 942, 308 to an asset in a focus tenant 212 after authorization 946 in an assistant tenant 214, or utilizing 900 a cross-tenant built-in access 942, 308 to an asset in a focus tenant 212 after authorization 946 in an assistant tenant 214.

In some embodiments, the cybersecurity method 700 includes at least one of: getting 1018 a granular delegated admin privileges token 904 from an identity provider 906; using a granular delegated admin privileges token to query 918 a device API 812; or using a granular delegated admin privileges token to query 920 an identity API 820.

Some embodiments provide or utilize a computing system 202 configured for focused secure cross-tenant access 210, the system including: a digital memory 112; a processor set 110 including at least one processor 110, the processor set in operable communication with the digital memory, the processor set configured to execute a focused secure cross-tenant access method 700 which includes creating 512 or modifying 512 a product-specific cross-tenant role 1002, and enforcing 1410 cross-tenant access to an asset 830 based on at least the product-specific cross-tenant role.

In some embodiments, the processor set is further configured to provide or utilize a cross-tenant built-in access functionality 942, 308 to an asset in a focus tenant 212 after authorization 946 in an assistant tenant 214.

In some embodiments, the processor set is further configured to determine 1306 based on at least an exclusion group 828 that an asset is or includes an excluded asset, and in response to the determination, restrict 1310 access to the excluded asset during a cross-tenant remediation action 908. In some of these embodiments, the exclusion group includes at least one of: a device group 810, or a user account group 818.

Some embodiments include a cross-tenant remediation action built-in access 942, 308 to at least one of: an endpoint security tool 924; an identity security tool 926; or an application security tool 928.

Some embodiments include a cross-tenant role assignment store 1106.

Some embodiments include a granular delegated admin privileges token 904.

Some embodiments include a permissions calculation software component 1010 which upon execution by a processor set gets 1014 a cross-tenant role assignment 1002 and calculates 1010 a user permission 1008 based on at least the cross-tenant role assignment.

Some embodiments include a permissions calculation software component 1010 which upon execution by a processor set gets 1016 a partner tenant group membership 838 and calculates 1010 a user permission 1008 based on at least the partner tenant group membership.

Some embodiments provide or utilize a computer-readable storage device 112, 114 configured with data 118 and instructions 116 which upon execution by a processor 110 cause a computing system 202 to perform a focused secure cross-tenant access method 700, the method including: receiving 722 an attempted cross-tenant access to an asset during a remediation action 908 or intercepting 1302 an attempted cross-tenant access to an asset during a remediation action 908; and computationally restricting 1310 the attempted cross-tenant access based on at least one of: a product-specific cross-tenant role 1002 covering the asset, or an exclusion group 828 containing the asset.

In some embodiments, a second asset resides in a focus tenant, and the method includes at least one of: providing a cross-tenant built-in access 942, 308 to the second asset based on an authorization 946 in an assistant tenant; or utilizing a cross-tenant built-in access 942, 308 to the second asset based on an authorization 946 in an assistant tenant.

In some embodiments, the method 700 includes at least one of: determining 1306 an exclusion status 1308 of the asset based on at least the exclusion group; or determining 1406 a product-specific role status 1408 of the asset based on at least the product-specific cross-tenant role.

In some embodiments, the method 700 includes getting 1018 a granular delegated admin privileges token from an identity provider.

In some embodiments, the method 700 includes at least one of: using a granular delegated admin privileges token 904 to query a device API regarding the asset; or using a granular delegated admin privileges token 904 to query an identity API regarding the asset.

In short, some embodiments provide a solution for Product Specific Role Based Access Control (RBAC) support for Granular Delegated Admin Privilege (GDAP). Some embodiments allow workload cross-tenant product role assignment for GDAP and GDAP login to customer tenants with workload custom roles, calculating permissions, and RBAC enforcement. Some embodiments validate that cross tenant role assignments exist, and calculate product cross tenant role permission and scopes.

Additional Observations about Internet of Things

In some embodiments, the system 202 is an embedded system such as an Internet of Things system. "IoT" or "Internet of Things" means any networked collection of addressable embedded computing or data generation or actuator nodes. An individual node is referred to as an internet of things device 101 or IoT device 101 or internet of things system 102 or IoT system 102. Such nodes are examples of computer systems 102 as defined herein, and may include or be referred to as a "smart" device, "endpoint", "chip", "label", or "tag", for example, and IoT may be referred to as a "cyber-physical system". In the phrase "embedded system" the embedding referred to is the embedding a processor and memory in a device, not the embedding of debug script in source code.

IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage-RAM chips or ROM chips provide the only local memory; (e) no CD or DVD drive; (f) being embedded in a household appliance or household fixture; (g) being embedded in an implanted or wearable medical device; (h) being embedded in a vehicle; (i) being embedded in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

Technical Character

The technical character of embodiments described herein will be apparent to one of ordinary skill in the art, and will also be apparent in several ways to a wide range of attentive readers. Some embodiments address technical activities such as creating 504 security group data structures 326, creating 510 access entitlement package data structures 530, setting up 512 cross tenant role assignments 408, and constraining 712 access based on IP address 440 or managed device 426 status, which are each an activity deeply rooted in computing technology. Some of the technical mechanisms discussed include, e.g., software 216 to monitor access policies 138 and track roles 134, audit 130 correlation subsystems 316, case management subsystems 312, and scenario analysis subsystems 324. Some of the technical effects discussed include, e.g., detection 602 of cross-tenant access hampering changes or additions in conditional access policies 402, detection of cross-tenant access hampering changes in role assignments 408, detection 706 of rogue roles 414, 134, and correlation 314 of activities in a focus tenant 212 with activities in an assistant tenant 214. Thus, purely mental processes and activities limited to pen-and-paper are clearly excluded. Other advantages based on the technical characteristics of the teachings will also be apparent to one of skill from the description provided.

One of skill understands that a cross-tenant access activity in a cloud computing environment is a technical activity which cannot be performed mentally, because it requires computing system activities in a focus tenant 212 or activities in an assistant tenant 214, or both. This includes, for example, creating, reading, modifying, or deleting data structures 402, 408, 326, in computer system memory. Moreover, mental or pen-and-paper activity cannot configure a computing system to perform secure cross-tenant access as described herein. One of skill also understands that attempting to perform secure cross-tenant access only manually would create unacceptable delays in program execution, and would introduce a severe risk of human errors that can cause programs to crash or expose system to serious security risks, for example. People manifestly lack the speed, accuracy, memory capacity, and specific processing capabilities required to perform secure cross-tenant access as described herein.

In particular, secure cross-tenant access as described herein is a part of computing technology. Hence, the secure cross-tenant access improvements such as functionality 204 described herein are improvements to computing technology.

Herein, access or any other activity by a user refers to activity by a user device, or by a user account, or by software on behalf of a user, or by hardware on behalf of a user. Activity is represented by digital data or machine operations or both in a computing system. Activity by a user referenced within the scope of any claim based on the present disclosure excludes human actions per se, and thus does not bring human behavior per se within the scope of any embodiment or any claim.

Different embodiments provide different technical benefits or other advantages in different circumstances, but one of skill informed by the teachings herein will acknowledge that particular technical advantages will likely follow from particular embodiment features or feature combinations, as noted at various points herein. Any generic or abstract aspects are integrated into a practical application such as an access control identify service 506 within a set of cybersecurity controls, a security or managed service case management tool 312, or an audit tool 316.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not.

Rather, the present disclosure is focused on providing appropriately specific embodiments whose technical effects fully or partially solve particular technical problems, such as how to improve the security of cross-tenant access, how to detect unauthorized activities during cross-tenant access, and how to detect unauthorized roles during cross-tenant access. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, tools, peripherals, software process flows, identifiers, data structures, data selections, naming conventions, notations, control flows, or other implementation choices described herein. Any apparent conflict with any other patent disclosure, even from the owner of the present subject matter, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

AAD: Azure® Active Directory® (marks of Microsoft Corporation)
ALU: arithmetic and logic unit
AOBO: action on behalf of, a.k.a. administrate on behalf of
API: application program interface
BIOS: basic input/output system
CA: conditional access
CD: compact disc
CPU: central processing unit
DVD: digital versatile disk or digital video disc
ELM: AAD Entitlement Management
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
JIT: just in time
LAN: local area network
MEM: Microsoft Endpoint Manager
MSE: Microsoft Experts
OS: operating system
PaaS or PAAS: platform-as-a-service
RAM: random access memory
ROM: read only memory
TPU: tensor processing unit
UEFI: Unified Extensible Firmware Interface
UI: user interface
WAN: wide area network
XTAP: cross tenant access policy

Some Additional Terminology

Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Sharing a reference numeral does not mean necessarily sharing every aspect, feature, or limitation of every item referred to using the reference numeral. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin (x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud 136 may be private, public, community, or a hybrid, and cloud services may be offered in the form of infrastructure as a service (IaaS), platform as a service (PaaS), software as a service (Saas), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" may also be used as a patent law term of art, e.g., in describing a process claim as opposed to a system claim or an article of manufacture (configured storage medium) claim. Similarly, "method" is used herein primarily as a technical term in the computing science arts (a kind of "routine") but it is also a patent law term of art (akin to a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

Unless stated otherwise, in all examples a conditional access policy hampering change is a change which hampers an authorized access to a focus tenant by a user from an assistant tenant, a hampering conditional access policy addition is an addition of a conditional access policy which hampers the authorized access to the focus tenant by the user from the assistant tenant, and a cross tenant role assignment hampering change is a change which hampers the authorized access to the focus tenant by the user from the assistant tenant. Here, as elsewhere herein, "by a user" means by a user device, or by a user account, or by software on behalf of a user, or by hardware on behalf of a user. Also, as elsewhere herein, authorized access to the focus tenant by the user from the assistant tenant is also referred to more concisely as "authorized access to the focus tenant from the assistant tenant".

In all examples, unless stated otherwise, "hampering" means blocking, slowing down, encumbering, hindering, or obstructing.

The terms "cross tenant" and "cross-tenant" are used interchangeably herein.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. SCTA operations such as reading or modifying identity provider 506 entries, analyzing 322 policies 138 for access hampering 310 impact, and many other operations discussed herein (whether recited in the Figures or not), are understood to be inherently digital. A human mind cannot interface directly with a CPU or other processor, or with RAM or other digital storage, to read and write the necessary data to perform the SCTA steps 700 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this disclosure discusses various data values and data structures, and recognize that such items reside in a memory (RAM, disk, etc.), thereby configuring the memory. One of skill will also recognize that this disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as accessing, adding, alerting, analyzing, auditing, checking, comparing, constraining, correlating, creating, deleting, detecting, executing, improving, inspecting, investigating, mitigating, modifying, monitoring, offboarding, onboarding, performing, receiving, requesting, responding, setting up, tracking, using (and accesses, accessed, adds, added, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest. Example verbs listed here may overlap in meaning or even be synonyms; separate verb names do not dictate separate functionality in every case.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other storage device or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory and computer readable storage devices are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe aspects of embodiments by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102

101 machine in a system 102, e.g., any device having at least a processor 110 and a memory 112 and also having a distinct identifier such as an IP address or a MAC (media access control) address; may be a physical machine or be a virtual machine implemented on physical hardware

102 computer system, also referred to as a "computational system" or "computing system", and when in a network may be referred to as a "node"

104 users, e.g., user of an enhanced system 202

105 user account, as represented in a computing system

106 peripheral device

108 network generally, including, e.g., LANs, WANs, software-defined networks, clouds, and other wired or wireless networks

110 processor or set of processors; includes hardware

112 computer-readable storage medium, e.g., RAM, hard disks

114 removable configured computer-readable storage medium

116 instructions executable with processor; may be on removable storage media or in other memory (volatile or nonvolatile or both)

118 digital data in a system 102; data structures, values, source code, and other examples are discussed herein

120 kernel(s), e.g., operating system(s), BIOS, UEFI, device drivers; also refers to an execution engine such as a language runtime

122 software tools, software applications, security controls; computational

124 tenant in a multi-tenant cloud computing environment; a collection of computational resources at a level between individual users and the cloud overall

126 display screens, also referred to as "displays"

128 computing hardware not otherwise associated with a reference number 106, 108, 110, 112, 114

130 audit, as represented in a computing system; 130 refers to logs which hold audit events 132 and to the computational activity of creating, maintaining, or analyzing such logged events

132 computational event, as represented in a computing system log

134 user role, as represented in a computing system

136 cloud, also referred to as cloud environment or cloud computing environment

138 access policy, as represented in a computing system

202 enhanced computing system, i.e., system 102 enhanced with functionality 204 as taught herein

204 secure cross-tenant access functionality (also referred to as "SCTA functionality"), e.g., software or specialized hardware which performs or is configured to perform steps 302 and 602, or steps 304 and 602, or steps 302 and 304 and 602, or steps 602 and 604, or steps 602 and 306, or any software or hardware which performs or is configured to perform a novel method 700 or a computational cross-tenant access securing activity first disclosed herein, or a computational cross-tenant access activity first disclosed herein

206 computationally secure an access, also refers to security as a characteristic of a computing system, and to security measures

208 cross-tenant (a.k.a. "cross tenant"), i.e., from or on behalf of one tenant to or on behalf of another tenant

210 access in or to a computing system; refers to a computational activity or to an instance of the computational activity, or both, per context

212 focus tenant 124 in a cloud computing environment

214 assistant tenant 124 in a cloud computing environment; it is possible in some cases for a given tenant to be a focus tenant in one scenario and also be an assistant tenant in another scenario

216 SCTA components in a computing system, e.g., services 506, 508, and other software which provides functionality 204 upon execution, data structures such as 134, 138, 326, 402, 408, 430, 506, 530 which support or implement functionality 204, flows 524, 526, 528 which support or implement functionality 204

302 computationally monitor a policy 138, e.g., by polling, by a callback or hook on a routine configured to access policies 138, by scanning a log for events corresponding to policy access, or via a policy management API

304 computationally track a role 134, e.g., by polling, by a callback or hook on a routine configured to access roles 134, by scanning a log for events corresponding to role access, or via a role management API

306 computationally alert, e.g., by sending an email or text message, by modifying a GUI, or both

308 computing system access which is authorized in a given scenario

310 computationally hamper an authorized access; an identified threat to authorized access scope is also a hampering, and a circumstance in which reduction of authorized access scope is more likely than not is also a hampering

312 case management subsystem of a computing system; also referred to as a case management system or tool

314 computationally correlate events from logs of different tenants, also referred to as producing a correlated audit

316 audit correlation subsystem of a computing system; also referred to as an audit correlation system or tool

318 computing system role 134 which is authorized in a given scenario

320 list (not necessarily ordered) of authorized roles; digital

322 computationally analyze a role change or a policy change or both, to determine whether hampering 310 is implicated; 322 also refers to a digital result of such computational activity; in some embodiments includes an adaptation of what-if analysis

324 scenario analysis subsystem of a computing system; also referred to as a scenario analysis system or tool

326 security group data structure, also referred to as security group, in a computing system

328 interface generally in a computing system; computational, digital

402 conditional access policy in a computing system

404 scope of a policy in a computing system, e.g., which activities are allowed or barred

406 user computational activity in general; human behavior per se is excluded

408 cross tenant role assignment in a computing system

410 security command in a computing system

412 command in a computing system

414 rogue (unauthorized) role 134

416 managed service in a computing system

418 managed service command in a computing system

420 zero standing characteristic of an access session, as opposed to standing access which does not involve a fresh request for each access session

422 time bound characteristic of an access session, as opposed to perpetual or unlimited time which does automatically expire an access session after a specified time elapses

424 access session (a.k.a. access) which is zero standing or time bound or both

426 managed device 101, as opposed to a device not managed; managed devices are managed, e.g., with regard to which software they contain, which security controls they are subject to, and auditing

428 granular delegated administrative privileges (GDAP) characteristic of a security group

430 GDAP or DAP group in a computing system

432 access request; computational activity or data structure

436 access scope, as represented in a computing system

438 resource in a computing system, e.g., hardware, software, data; excludes living creatures or ideas
440 IP address, as represented in a computing system
442 range or other set of one or more IP addresses, as represented in a computing system
444 change in a policy 138 or role 134, as represented in a computing system; content modification, priority modification, and content deletion are each examples of change
446 addition of a policy 138 or role 134, as represented in a computing system
500 data flow diagram; system architecture consistent with FIG. 5 data flow diagram
502 computationally onboard a managed service
504 computationally create a security group
506 directory service, also referred to as identity service, e.g., Azure® Active Directory® service (marks of Microsoft Corporation) or an LDAP (lightweight directory access protocol) service
508 AOBO (i.e., action on behalf of, a.k.a. administrate on behalf of) service
510 computationally create access entitlement package or other access entitlement or enablement data structure
512 computationally set up a cross tenant role assignment
514 access entitlement or enablement service
516 access request response data structure or computational activity
518 computationally add a user to a security group
520 computationally offboard cross tenant access in assistant tenant
522 computationally offboard cross tenant access in focus tenant
524 cross tenant access onboarding phase
526 cross tenant access focus tenant resource accessing phase
528 cross tenant access offboarding phase
530 access entitlement package or other access entitlement or enablement data structure
600 flowchart; 600 also refers to cross tenant access methods that are illustrated by or consistent with the FIG. 6 flowchart or any variation of the FIG. 6 flowchart described herein
602 computationally detect hampering 310 or another impact or likely impact of a change or addition to access policy 138 or role assignment 408 in a computing system, e.g., by detecting removal or scope reduction of an access token, access duration, or access permission, or by detecting a role 414 that is not in a list 320 of authorized roles
604 computationally modify an access policy 138, a role assignment 408, or another aspect of cross tenant access scope 436, e.g., access duration
700 flowchart; 700 also refers to cross tenant access methods that are illustrated by or consistent with the FIG. 7 flowchart, which incorporates the information in FIG. 5, FIG. 6, FIGS. 8 through 14, and other steps taught herein, or methods that are illustrated by or consistent with any variation of the FIG. 7 flowchart described herein
702 computationally check for a change or addition to access policy (ies) 138, e.g., based on an access timestamp, historic and current policy hash comparison, or other mechanism
704 computationally inspect a role assignment 408, e.g., via an API
706 computationally detect a rogue role 414 that is not in a list 320 of authorized roles
708 computationally receive a command 412, e.g., via a user interface API or other API
710 computationally execute a command 412, e.g., via a kernel 120, tool 122, or other software
712 computationally constrain an authorized access, e.g., by denying or terminating access when a constraint is not met, such as a IP address or managed device or access duration constraint
714 computationally use a security group, e.g., to constrain access
716 computationally use a GDAP group, e.g., to constrain access
718 computationally mitigate a security vulnerability, e.g., by reducing an attack surface, repairing damage done from an attack, adding an additional layer of defense against attack, or closing a security gap
720 computationally investigate a security vulnerability, e.g., by analyzing a log, or checking for vulnerability indicia in a computing system
722 computationally receive an access request, e.g., via a user interface API or other API; an example of identifying an access request
724 computationally perform activity in a tenant
726 computationally improve security of a tenant, e.g., by mitigating 718 a security vulnerability, or by reducing an attack surface regardless of any particular known vulnerability, or by increasing authentication requirements for access to tenant resources
728 any step or item discussed in the present disclosure that has not been assigned some other reference numeral; 728 may thus be shown expressly as a reference numeral for various steps or items or both, and may be added as a reference numeral (in the current disclosure or any subsequent patent application which claims priority to the current disclosure) for various steps or items or both without thereby adding new matter
800 architecture data flow diagram; 800 also refers to cross tenant access methods and structures that are illustrated by or consistent with FIG. 8 or any variation of FIG. 8 described herein
802 admin portal; computational
804 managed response customer API; computational
806 computationally create or modify one or more asset exclusion groups 828
808 computationally add one or more assets 830 to a group
810 security device group, as represented in a computing system
812 device group API; computational
814 computationally create one or more device asset exclusion groups
816 computationally add one or more device assets to a device exclusion group
818 security user account groups, a.k.a. user group, as represented in a computing system
820 user group API; computational
822 computationally create one or more user asset exclusion groups
824 computationally add one or more user identity assets to a user identity exclusion group
826 computationally store an exclusion group 828, e.g., in an asset exclusion database 842
828 asset 830 exclusion list, as represented in a computing system; also referred to as asset 830 exclusion group; implemented, e.g., using security device group, security user identity group, or tag such as high priority device tag or high priority user tag

830 asset in a computing system; computational or digital or both; resources 438 are assets 830 which are not necessarily subject to exclusion

832 computationally generate an authorization error

834 authorization error, as represented in a computing system

836 computationally check, check for, or otherwise validate a GDAP relationship

838 membership of an asset in an exclusion group, as represented in a computing system

840 GDAP relationship store in a computing system

842 asset exclusion database in a computing system

900 architecture data flow diagram; 900 also refers to cross tenant access methods and structures that are illustrated by or consistent with FIG. 9 or any variation of FIG. 9 described herein

902 analyst portal; computational

904 GDAP token; digital

906 digital identity provider in a computing system

908 managed (e.g., by analysts or other security experts) response to a security incident, as represented in a computing system; also referred to as a remediation action

910 managed response expert API

912 assets API, e.g., for asset creation, modification, movement, status, or other asset management operation in a computing system

914 computationally get assets (e.g., by getting asset identifier)

916 computationally get asset exclusion(s) (e.g., by getting asset exclusion group identifier or content)

918 computationally check, check for, or otherwise validate a device membership in a group

920 computationally check, check for, or otherwise validate a user membership in a group

922 security tool generally; computational

924 endpoint security tool; computational

926 identity security tool; computational

928 application security tool; computational

930 device action in a computing system

932 identity action in a computing system

934 application action in a computing system

936 remedial action in a computing system, to provide or secure cybersecurity

938 computationally filter a set of assets; also refers to a digital result of such computational activity

940 managed service persona in a computing system

942 built-in access permitting cross-tenant remediation action without additional login after, e.g., analyst portal login

944 access requirement as represented or implemented (or both) in a computing system, e.g., multifactor authentication, activity logging, use of a particular network protocol, avoidance of a particular network protocol, redirection prohibition, forwarding prohibition, use of a particular encryption protocol, avoidance of a particular encryption protocol, authorized device usage, authorized location, use of a particular security tool or security protocol, etc.

946 authorization as represented or implemented (or both) in a computing system, e.g., authentication, permissions compliance, or both

1000 architecture data flow diagram; 1000 also refers to cross tenant access methods and structures that are illustrated by or consistent with FIG. 10 or any variation of FIG. 10 described herein

1002 cross-tenant product role assignment, as represented in a computing system

1004 cross tenant workload role assignment functionality in a computing system

1006 security group "member of" routine

1008 user permission, as represented in a computing system

1010 permissions calculation software

1012 workload rules functionality in a computing system

1014 computationally get cross-tenant role assignment

1016 computationally get partner tenant group membership or membership status

1018 computationally acquire a token from an identity provider

1020 software products, e.g., software, software-as-a-service

1022 computationally log into a computing system

1100 architecture data flow diagram; 1100 also refers to cross tenant access methods and structures that are illustrated by or consistent with FIG. 11 or any variation of FIG. 11 described herein

1102 customer global admin, as represented in a computing system

1104 workload cross tenant role assignment API

1106 computationally store role assignment

1108 consent of a customer admin, as represented in a computing system

1110 computationally store consent

1112 consent store in a computing system

1114 computationally validate cross tenant role assignment

1116 computationally update workload cross tenant role assignment

1200 architecture data flow diagram; 1200 also refers to cross tenant access methods and structures that are illustrated by or consistent with FIG. 12 or any variation of FIG. 12 described herein

1202 computationally acquire a token

1204 computationally authenticate to a product API

1206 computationally check for a role assignment

1208 computationally get an on-behalf-of (OBO) token

1210 computationally check a security group membership of a role assignment

1212 computationally get an effective role membership

1214 computationally enforce role-based access control

1300 flowchart; 1300 also refers to cross tenant access methods that are illustrated by or consistent with the FIG. 13 flowchart or any variation of the FIG. 13 flowchart described herein

1302 computationally intercept an access attempt, e.g., an access request, e.g., via an API, shim, or security control such as a firewall, packet inspection tool, exfiltration detection tool, or intrusion detection tool; an example of identifying an access request

1306 computationally determine an exclusion status of an asset, e.g., by checking for membership of the asset in exclusion group(s), or based on a exclusion flag or exclusion property or tag stored in the asset or in association with the asset

1308 exclusion status of an asset, as represented in a computing system; indicates whether the asset is excluded from being accessed by cross-tenant remediation activity

1310 computationally restrict access to an asset, either by barring a requested access or by conditioning a requested access on some additional requirement such as multifactor authentication, heightened logging, etc.

Figure 14:
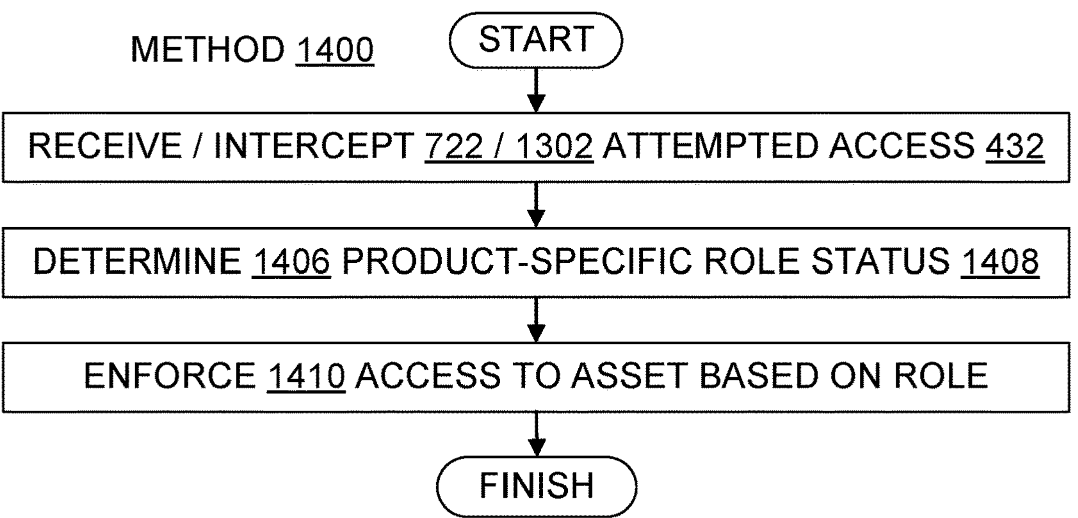
FIG. 14 is a flowchart further illustrating steps in a secure cross-tenant access method which utilizes a product-specific role.

1400 flowchart; 1400 also refers to cross tenant access methods that are illustrated by or consistent with the FIG. 14 flowchart or any variation of the FIG. 14 flowchart described herein

1406 computationally determine a coverage status of an asset with respect to a product-specific role, e.g., by checking directories, manifests, or build files for an association between the asset and a product (tool, solution) which the asset is part of or which the asset supports

1408 role coverage status of an asset, as represented in a computing system; indicates whether the asset is covered by policy associated with a role in connection with being accessed by cross-tenant remediation activity

1410 computationally enforce access to an asset per a role 1002, e.g., by allowing a requested access, by barring a requested access, or by conditioning a requested access on some additional requirement such as multifactor authentication, heightened logging, etc., depending on the coverage of the asset that is associated with the role.

CONCLUSION

Some embodiments in a cloud computing environment 100 include monitoring 302 conditional access policies 402 for changes 444 or additions 446 that hamper 310 or threaten to hamper an authorized access 308 from an assistant tenant 214 user to a focus tenant 212 resource. In some embodiments, cross-tenant access security 700 includes tracking 304 a role assignment list 320 to detect 706 rogue roles 414, or to detect 602 hampering role changes 444 such as role deletions, or both. In some embodiments, focus tenant events 132 and assistant tenant events 132 are correlated 314 in an audit 130. In some embodiments, the authorized access 308 is a zero standing time bound access 424. In some embodiments, the authorized access 308 is constrained 712 to an IP address range 442, or constrained 712 to login from a managed device 426, or both. In short, security measures 206, 216, 500, 700 are described that mitigate 726 accidental or surreptitious role or policy changes that would shut down or hinder authorized cross-tenant access 308.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; it is not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A cybersecurity method for focused secure cross-tenant access, the method comprising computationally, by a processor:

granting a first tenant permission to perform at least one remediation action on one or more second assets of a second tenant;

identifying an attempted cross-tenant access from the first tenant to a particular second asset of the second tenant, the attempted cross-tenant access requesting to perform a particular remediation action relating to the particular second asset; and computationally restricting the attempted cross-tenant access based on at least an exclusion group including the particular second asset, wherein the exclusion group specifies that the particular second asset is excluded, as opposed to included, based on at least one of: a membership in the exclusion group, an exclusion flag, an exclusion property, or an exclusion tag which is stored in the particular second asset or stored in association with the particular second asset.

2. The method of claim 1, further comprising:

computationally creating the exclusion group.

3. The method of claim 1, further comprising:

computationally creating a product-specific cross-tenant role for the first tenant.

4. The method of claim 3, wherein computationally creating the product-specific cross-tenant role comprises at least one of:

utilizing an access-on-behalf-of service; or utilizing a workload cross-tenant role management service.

5. The method of claim 3, further comprising:

granting, to the first tenant, built-in access to the particular second asset in the second tenant after authorization in the product-specific cross-tenant role.

6. The method of claim 1, further comprising:

receiving a granular delegated admin privileges token from an identity provider; and at least one of:

using the granular delegated admin privileges token to query a device API; or using the granular delegated admin privileges token to query an identity API.

7. The method of claim 1, wherein the first tenant is provided with access to perform remediation actions on one or more second devices of the second tenant and restricted from performing remediation actions on one or more other second devices of the second tenant that are in the exclusion group.

8. The method of claim 1, wherein the first tenant is provided with access to perform remediation actions for one or more second users of the second tenant and restricted from performing remediation actions for one or more other second users of the second tenant that are in the exclusion group.

9. A computing system configured for focused secure cross-tenant access, the system comprising:

a digital memory;

a processor set comprising at least one processor, the processor set in operable communication with the digital memory, the processor set configured to:

grant a first tenant permission to perform at least one remediation action on one or more second assets of a second tenant;

identify an attempted cross-tenant access from the first tenant to a particular second asset of the second tenant, the attempted cross-tenant access requesting to perform a particular remediation action relating to the particular second asset; and restrict the attempted cross-tenant access based on at least an exclusion group that includes the particular second asset;

wherein the exclusion group specifies that the particular second asset is excluded, as opposed to included, based on at least one of: a membership in the exclusion group, an exclusion flag, an exclusion property, or an exclusion tag which is stored in the particular second asset or stored in association with the particular second asset.

10. The system of claim 9, wherein the processor set is further configured to:

allow the first tenant to access to another second asset of the second tenant after authorization.

11. The system of claim 9, wherein the processor set is further configured to:

determine, based on at least the exclusion group, that the particular second asset comprises an excluded asset.

12. The system of claim 11, wherein the exclusion group comprises at least one of: a device group, or a user account group.

13. The system of claim 9, wherein the particular remediation action is performed by at least one of:

an endpoint security tool;

an identity security tool; or an application security tool.

14. The system of claim 9, wherein the processor set is configured to implement a permissions calculation software component, which, upon execution, gets a cross-tenant role assignment and calculates a user permission based on at least the cross-tenant role assignment.

15. The system of claim 9, wherein the processor set is configured to implement a permissions calculation software component which, upon execution, gets a partner tenant group membership and calculates a user permission based on at least the partner tenant group membership.

16. A computer-readable storage device configured with data and instructions which, upon execution by a processor, cause a computing system to perform a focused secure cross-tenant access method, the method comprising:

granting a first tenant permission to perform at least one remediation action on one or more second assets of a second tenant:

identifying an attempted cross-tenant access from the first tenant to a particular second asset of the second tenant, the attempted cross-tenant access requesting to perform a particular remediation action relating to the particular second asset; and computationally restricting the attempted cross-tenant access based on an exclusion group including the particular second asset, wherein the exclusion group specifies that the particular second asset is excluded, as opposed to included, based on at least one of: a membership in the exclusion group, an exclusion flag, an exclusion property, or an exclusion tag which is stored in the particular second asset or stored in association with the particular second asset.

17. The computer-readable storage device of claim 16, wherein the method further comprises:

granting, to the first tenant, access to another second asset that is not in the exclusion group based on an authorization of the first tenant.

18. The computer-readable storage device of claim 16, wherein the method further comprises:

determining a product-specific role status of another second asset based on at least a product-specific cross-tenant role.

19. The computer-readable storage device of claim 16, wherein the method further comprises;

receiving a granular delegated admin privileges token from an identity provider.

20. The computer-readable storage device of claim 19, wherein the method further comprises at least one of:

using the granular delegated admin privileges token to query a device API regarding the particular second asset; or using the granular delegated admin privileges token to query an identity API regarding the particular second asset.

* * * * *